US012633167B2

(12) United States Patent
Hamid et al.

(10) Patent No.: US 12,633,167 B2
(45) Date of Patent: May 19, 2026

(54) LIVENESS DETECTION

(71) Applicants: Laurence Hamid, Ottawa (CA);
Stephen Borza, Ottawa (CA)

(72) Inventors: Laurence Hamid, Ottawa (CA);
Stephen Borza, Ottawa (CA)

( * ) Notice: Subject to any disclaimer, the term of this
patent is extended or adjusted under 35
U.S.C. 154(b) by 67 days.

(21) Appl. No.: 18/662,847

(22) Filed: May 13, 2024

(65) Prior Publication Data

US 2024/0296699 A1 Sep. 5, 2024

Related U.S. Application Data

(63) Continuation of application No. 18/168,232, filed on
Feb. 13, 2023, now Pat. No. 11,983,964, which is a
continuation of application No. 17/372,748, filed on
Jul. 12, 2021, now Pat. No. 11,704,939, which is a
continuation of application No. 16/437,220, filed on
Jun. 11, 2019, now Pat. No. 11,093,772.

(60) Provisional application No. 62/683,096, filed on Jun.
11, 2018.

(51) Int. Cl.
*G06V 40/40* (2022.01)
*G06F 21/32* (2013.01)
*G06V 40/16* (2022.01)
*G06V 40/18* (2022.01)

(52) U.S. Cl.
CPC .............. *G06V 40/45* (2022.01); *G06F 21/32*
(2013.01); *G06V 40/171* (2022.01); *G06V*
*40/161* (2022.01); *G06V 40/193* (2022.01)

(58) Field of Classification Search
CPC ........... G06K 9/00906; G06K 9/00281; G06K
9/0061; G06K 9/00228; G06K 9/00201;
G06K 9/00288; G06K 9/00268; G06F
21/32; G06F 2221/2133
See application file for complete search history.

(56) References Cited

U.S. PATENT DOCUMENTS

| | | | |
|---|---|---|---|
| 8,856,541 B1 | 10/2014 | Chaudhary et al. | |
| 9,898,596 B2 * | 2/2018 | Lindemann ........... | H04L 63/083 |
| 9,971,894 B2 * | 5/2018 | Shear .................. | H04L 63/0861 |
| 10,270,748 B2 | 4/2019 | Briceno et al. | |
| 10,769,635 B2 | 9/2020 | Lindemann | |
| 11,704,939 B2 * | 7/2023 | Hamid ................. | G06V 40/168 |
| 11,983,964 B2 * | 5/2024 | Hamid .................. | G06V 40/45 |

(Continued)

*Primary Examiner* — Dhaval V Patel
(74) *Attorney, Agent, or Firm* — Rosenberg, Klein & Lee

(57) ABSTRACT
Biometrics are increasingly used to provide authentication
and/or verification of a user in many security and financial
applications for example. However, "spoof attacks" through
presentation of biometric artefacts that are "false" allow
attackers to fool these biometric verification systems.
Accordingly, it would be beneficial to further differentiate
the acquired biometric characteristics into feature spaces
relating to live and non-living biometrics to prevent non-
living biometric credentials triggering biometric verifica-
tion. The inventors have established a variety of "liveness"
detection methodologies which can block either low com-
plexity spoofs or more advanced spoofs. Such techniques
may provide for monitoring of responses to challenges
discretely or in combination with additional aspects such as
the timing of user's responses, depth detection within
acquired images, comparison of other images from other
cameras with database data etc.

10 Claims, 13 Drawing Sheets

(56)     References Cited

U.S. PATENT DOCUMENTS

| | | | |
|---|---|---|---|
| 2016/0342851 A1* | 11/2016 | Holz | G06V 40/70 |
| 2017/0180362 A1* | 6/2017 | Du | G06F 21/35 |
| 2017/0185760 A1* | 6/2017 | Wilder | G06F 21/32 |
| 2017/0289144 A1* | 10/2017 | Ionita | G06F 21/629 |
| 2018/0337917 A1 | 11/2018 | Wallace et al. | |
| 2019/0130171 A1* | 5/2019 | Alameh | G06V 20/64 |
| 2019/0197331 A1 | 6/2019 | Kwak et al. | |
| 2020/0311238 A1* | 10/2020 | Ackerman | G06F 21/32 |

* cited by examiner

LIVENESS DETECTION

CROSS-REFERENCE TO RELATED APPLICATIONS

This patent application claims the benefit of priority as a continuation of U.S. patent application Ser. No. 18/168,232 filed Feb. 13, 2023; which itself claims the benefit of priority as a continuation of U.S. patent Ser. No. 17/372,748 filed Jul. 12, 2021 which has issued as U.S. Pat. No. 11,704,939; which itself claims the benefit of priority as a continuation of U.S. patent application Ser. No. 16/437,220 filed Jun. 11, 2019 which has issued as U.S. Pat. No. 11,093,772; which itself claims the benefit of priority from U.S. Provisional Patent Application No. 62/683,096 filed Jun. 11, 2018; the entire contents of each being incorporated herein by reference.

FIELD OF THE INVENTION

This patent application relates to authentication and biometrics and more particularly to methods and systems for establishing that biometric authentication is associated with a "live" user.

BACKGROUND OF THE INVENTION

Biometrics is the technology of establishing the identity of an individual based upon physical and/or behavioral attributes of the person. Within many systems and services biometrics can support and strengthen the underlying large-scale identity management and security systems whose functionality depends on the accurate deduction of an individual's identity. Such applications can range from granting physical or online access to verifying specific transactions. The main task of these identity management and security systems is the accurate determination and verification of an individual's identity.

Historically, general techniques for providing access to resources either physical or online has been through well-known methodologies exploiting passwords or identity (ID) cards. However, these identity verification techniques can easily be lost, tampered with, stolen, copied etc. thereby undermining the intended security. However, exploiting physical and biological properties of individuals, user biometrics, can offer improved security for a security system as these biometrics are harder to replicate by virtue of each biometric being unique amongst the general population although a combination may be required to separate identical twins. Some familiar identification biometrics include facial recognition, fingerprint recognition, handwriting verification, hand geometry, retinal scanning and iris scanning. Exploiting multiple biometrics increases the complexity of providing an authentication and hence the strength of the security system.

However, just as electronic security systems led to increasingly complex threats and attack mechanisms then the addition of biometrics to security and user authentication/verification has led to "spoof attacks." For example, amongst the many biometrics and biometric verification techniques facial recognition technology, which is direct, user friendly and convenient in contrast to other methods had led to its widespread deployment in various security systems. However, in general, facial recognition algorithms and the software/systems exploiting them are not able to differentiate a "live" face from a "not live" face which raises significant security issues. Accordingly, "spoof attacks" are the presentation of biometric artefacts that are "false" in that they do not relate to the "live" user. This is especially severe when easy-to-spoof biometrics traits are also the most convenient and advanced biometric techniques such as fingerprints and facial recognition, for example, such that attackers can fool these systems with relatively case.

Accordingly, it would be beneficial for biometric verification systems to be able to further differentiate the acquired biometric characteristics into feature spaces relating to live and non-living biometrics allowing for non-living biometric credentials to be prevented from triggering a biometric verification and thereby preventing imposters introducing spoofed biometrics either in seeking to register a user with a system exploiting biometric authentication or pretend to be another user to access a system with exploiting biometric authentication. For example, fingerprints can be acquired and copied as evident in many movies, television series etc. with relative low complexity methods. Similarly, with facial recognition a verification spoof may vary from low complexity spoofs to high complexity spoofs. Low complexity spoofs may include a stolen photo, stolen facial photos, or recorded video etc. acquired through dedicated equipment operated by the attacker such as a camera attached to an automatic teller machine (ATM), entry security system etc. or acquired by the attacker from social media or social networks etc. High complexity spoofs may exploit advanced digital simulation tools such as employed in computer animation, computer gaming, etc. exploiting three-dimensional (3D) facial models including those with abilities to simulate blinking, lip moving, expressions etc.

In addition, the time required for a human to respond to a movement challenge such as blinking etc. is long and varies significantly among individuals such that strict time verification of responses cannot be employed. Accordingly, strict time verification of a response is not feasible in such movement challenges such that attackers can generally synthesize responses faster than legitimate users can provide them using modern hardware and advanced algorithms.

Accordingly, it would be beneficial for biometric verification systems to differentiate live and non-living biometrics even where the spoofer is employing spoofed biometric credentials.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to authentication and biometrics and more particularly to methods and systems for establishing that biometric authentication is associated with a "live" user.

In accordance with an embodiment of the invention there is provided a method comprising:

providing an electronic device comprising a microprocessor, a network interface according to a predetermined standard for communicating to a communications network, and a plurality of interfaces, each interface at least one of an output interface of the electronic device for providing data to the user and an input interface of the electronic device for receiving data from the user;

receiving from the user via an input interface of the electronic device first inputs to establish a registration process for the user with a remote system also coupled to the communications network relating to at least one of a verification process, an authorisation process and an authentication process;

receiving from the remote system a plurality of challenges, each challenge generated by the remote system and to be presented to the user via one or more output interfaces of the electronic device;

receiving from the user via one or more input interfaces a plurality of second inputs, each second input comprising a predetermined portion of a response to a presented challenge of the plurality of challenges;

transmitting the plurality of second inputs to the remote system for processing to establish a plurality of stored responses, each stored response associated with a specific challenge of the plurality of challenges and to be subsequently employed as part of the at least one of the verification process, the authorisation process and the authentication process to confirm that a provider of subsequently generated responses to that specific challenge is the user.

In accordance with an embodiment of the invention there is provided a method comprising:

providing an electronic device comprising a microprocessor, a network interface according to a predetermined standard for communicating to a communications network, and a plurality of interfaces, each interface at least one of an output interface of the electronic device for providing data to the user and an input interface of the electronic device for receiving data from the user;

receiving from the user via an input interface of the electronic device first inputs relating to establishing the user's identity with a remote system also coupled to the communications network relating to at least one of a verification process, an authorisation process and an authentication process;

receiving from the remote system a plurality of challenges, each challenge generated by the remote system and to be presented to the user via one or more output interfaces of the electronic device;

receiving from the user via one or more input interfaces a plurality of second inputs, each second input comprising a predetermined portion of a response to a presented challenge of the plurality of challenges;

transmitting the plurality of second inputs to the remote system for processing to establish a plurality of provided responses, each provided response associated with a specific challenge of the plurality of challenges;

establishing in dependence upon a first portion of the plurality of provided responses and a plurality of stored responses whether the user is a live user providing the plurality of second inputs to the one or more input interfaces; and establishing in dependence upon a second portion of the plurality of provided responses and a plurality of stored responses whether the user is at least one of validated, authorised, and authenticated; wherein each stored response of the plurality of responses relates to a predetermined challenge of the plurality of challenges presented to the user; and the plurality of challenges presented to the user are a predetermined portion of the challenges stored within the remote system for presentation to the user.

In accordance with an embodiment of the invention there is provided a method comprising:

providing a sheet of sense trigger elements to a user, each sense trigger element comprising:

an identity;

at least a first material for elucidating a gustatory perception response of a user and a second material for elucidating an olfactory response of the user; and an indicator of whether the sense trigger element is associated with the gustatory perception response of the user or the olfactory response of the user;

providing to the user via an output interface of an electronic device associated with the user an element identity receiving from the user via an input interface of the electronic device a response established by the user in response to their either tasting the first material or smelling the second material as established by the indicator on the sense trigger element having its identity matching the element identity.

In accordance with an embodiment of the invention there is provided a method comprising establishing in dependence upon a first portion of a plurality of provided responses by a user and a plurality of stored responses provided by an individual during a registration process whether the user providing a plurality of second inputs to the one or more input interfaces of an electronic device to establish the first portion of the plurality of provided response is a live person.

In accordance with an embodiment of the invention there is provided a method comprising establishing in dependence upon a first portion of a plurality of provided responses by a user and a plurality of stored responses provided by an individual during a registration process whether the user providing a plurality of second inputs to the one or more input interfaces of an electronic device to establish the first portion of the plurality of provided response is the individual and providing at least one of a validation, an authorisation, and an authentication when the user is the individual.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
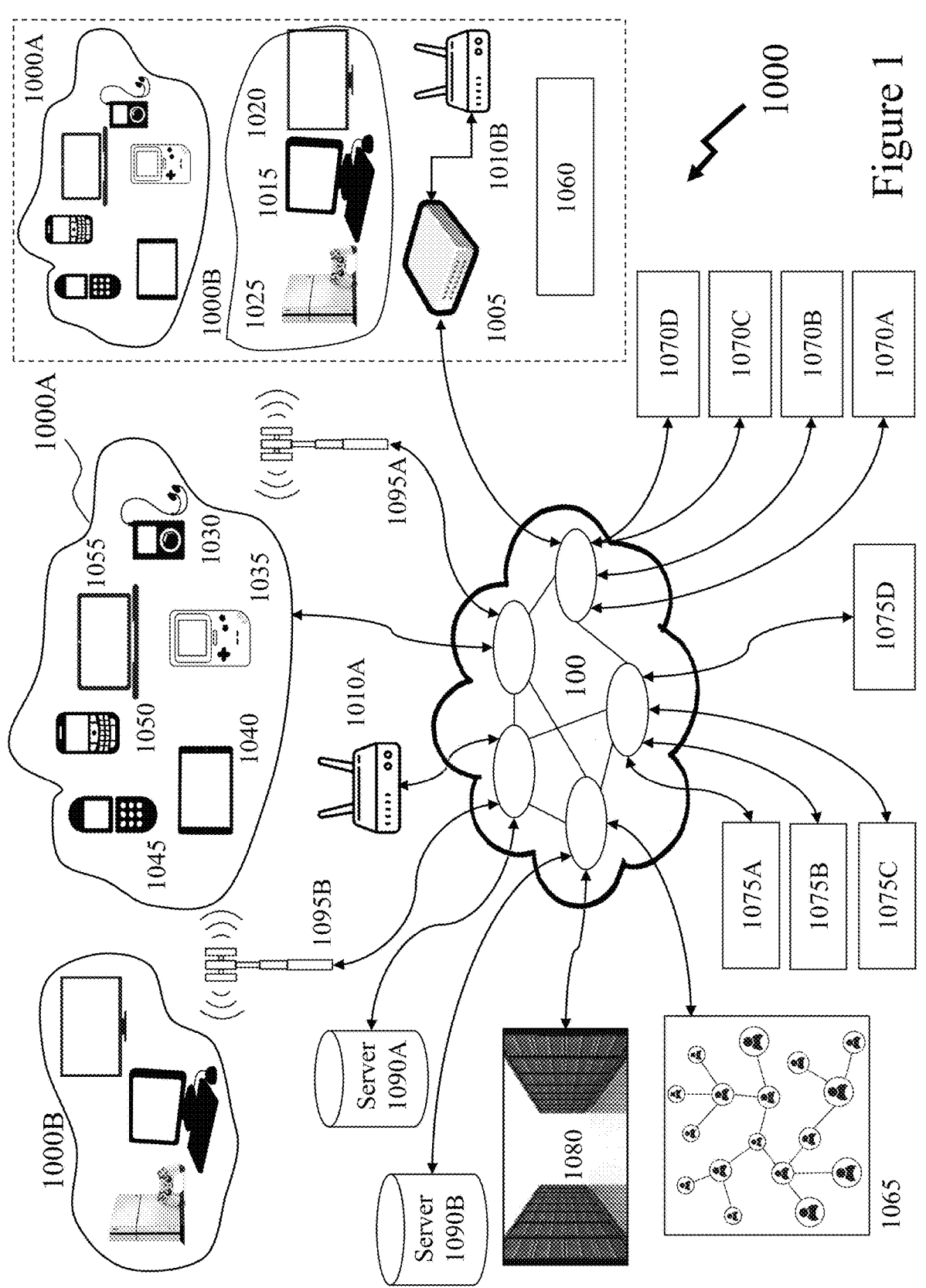
FIG. 1 depicts a network environment supporting embodiments of the invention.

The present description is directed to authentication and biometrics and more particularly to methods and systems for establishing that biometric authentication is associated with a "live" user.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, a smart fabric, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an automatic teller machine (ATM), a camera installation, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors. The wearable devices and/or wearable sensors may include, but not be limited to, devices that can stimulate and/or measure parameters that are designed to fit on or near the perineum, anal area, vagina, clitoral area, and nipples.

"Quantified self" as used herein may refer to, but is not limited to, the acquisition and storage of data relating to a user's daily life in terms of inputs (e.g. food consumed, quality of surrounding air), states (e.g. mood, arousal, blood oxygen levels), and performance (mental and physical). Acquisition of data may combine wearable sensors (EEG, ECG, video, etc.) and wearable computing together with audio, visual, audiovisual and text based content generated by the user.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to a user discretely including, but not limited to their biometric data and identity, either discretely or in combination with data relating to settings and/or limits of their biometrics. Such profiles may be established by a manufacturer/supplier/provider of a device, verification system, authentication system, security system, enterprise, etc. or they may be established by a user through a user interface for a device, a service, or a system or a PED/FED in communication with a device, another device, a server, a service provider etc.

"Geo-location" as used herein, and throughout this disclosure, refers to but is not limited to an identification or estimation of a real-world geographic location associated with a PED or FED. Geo-location in its simplest form involves the generation of a set of geographic coordinates and is closely related to the use of positioning systems such as those exploiting global navigation satellite systems (GNSS); wireless triangulation to cellular towers, base stations, etc.; triangulation to beacons which themselves are geo-located by one or more other methods; Internet and/or computer geo-location, etc.

"Internet and/or geo-location" as used herein, and throughout this disclosure, refers to associating a geographic location with an Internet Protocol (IP) address, MAC address, radio frequency identification (RFID), a hardware embedded article/production number, embedded software number (such as universally unique identity (UUID), exchangeable image file format (EXIF), Extensible Metadata Platform (XMP), steganography) etc., invoicing, Wi-Fi positioning system, device fingerprinting, canvas fingerprinting, or even self-disclosed information.

Referring to FIG. 1 there is depicted a network environment 1000 within which embodiments of the invention may be employed supporting devices, systems, applications, and platforms (DSAPs) according to embodiments of the invention. As shown first and second user groups 1000A and 1000B respectively interface to a telecommunications network 1000. Within the representative telecommunication architecture, a remote central exchange 1080 communicates with the remainder of a telecommunication service providers network via the network 1000 which may include for example long-haul OC-48/OC-192 backbone elements, an OC-48 wide area network (WAN), a Passive Optical Network, and a Wireless Link. The central exchange 1080 is connected via the network 1000 to local, regional, and international exchanges (not shown for clarity) and therein through network 1000 to first and second cellular APs 1095A and 1095B respectively which provide Wi-Fi cells for first and second user groups 1000A and 1000B respectively. Also connected to the network 1000 are first and second Wi-Fi nodes 1010A and 1010B, the latter of which being coupled to network 1000 via router 1005. Second Wi-Fi node 1010B is associated with Enterprise 1060, such as Adam & Eve™ for example, within which other first and second user groups 1000A and 1000B are disposed. Second user group 1000B may also be connected to the network 1000 via wired interfaces including, but not limited to, DSL, Dial-Up, DOCSIS, Ethernet, G.hn, ISDN, MoCA, PON, and Power line communication (PLC) which may or may not be routed through a router such as router 1005.

Within the cell associated with first AP 1010A the first group of users 1000A may employ a variety of PEDs including for example, laptop computer 1055, portable gaming console 1035, tablet computer 1040, smartphone 1050, cellular telephone 1045 as well as portable multimedia player 1030. Within the cell associated with second AP 1010B are the second group of users 1000B which may employ a variety of FEDs including for example gaming console 1025, personal computer 1015 and wireless/Internet enabled television 1020 as well as cable modem 1005. First and second cellular APs 1095A and 1095B respectively provide, for example, cellular GSM (Global System for Mobile Communications) telephony services as well as 3G and 4G evolved services with enhanced data transport support. Second cellular AP 1095B provides coverage in the exemplary embodiment to first and second user groups 1000A and 1000B. Alternatively the first and second user groups 1000A and 1000B may be geographically disparate and access the network 1000 through multiple APs, not shown for clarity, distributed geographically by the network operator or operators. First cellular AP 1095A as show provides coverage to first user group 1000A and environment 1070, which comprises second user group 1000B as well as first user group 1000A. Accordingly, the first and second user groups 1000A and 1000B may according to their particular communications interfaces communicate to the network 1000 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 1000A may form associations either through standards such as IEEE 802.15 and Bluetooth as well in an ad-hoc manner.

Also connected to the network 1000 are:

Social Networks (SOCNETS) 1065;

Original Equipment Manufacturer (OEM) 1070A, for example Google™, Samsung™, Apple™, etc.;

Manufacturer 1070B, for example Fitbit™, Microsoft™, LG™, etc.;

Retailer 1070C, for example Wal-Mart™, Target™, Walgreens™, Starbucks™, etc.;

Online retailer 1070D, for example Amazon™, JD.com, Otto™, etc.;

Website 1075A, for example Alibaba™, eBay™, etc.;

Service provider 1075B, for example Verizon™, Southern Company™, AT&T™, NextEra Energy™, etc.;

Third party service provider 1075C, for example Ernst & Young™, Moneris™, Ping Identity™, IBM™, etc.;

Enterprise 1075D, for example Wells Fargo™, Bank of America™, MasterCard™ Visa™ etc.; and First and second servers 1090A and 1090B which together with others, not shown for clarity.

Accordingly, a user employing one or more DSAPs may interact with one or more such providers, enterprises, service providers, retailers, third parties etc. and other users. First and second servers 1090A and 1090B may host according to embodiments of the inventions multiple services associated with a provider of devices, systems, applications, and platforms (DSAPs); a provider of a SOCNET or Social Media (SOCMED) exploiting DSAP features; a provider of a SOCNET and/or SOCMED not exploiting DSAP features; a provider of services to PEDS and/or FEDS; a provider of one or more aspects of wired and/or wireless communications; an Enterprise 1060 exploiting DSAP features; license databases; content databases; image databases; content libraries; customer databases; websites; and software applications for download to or access by FEDs and/or PEDs exploiting and/or hosting DSAP features. First and second primary content servers 1090A and 1090B may also host for example other Internet services such as a search engine, financial services, third party applications and other Internet based services.

Accordingly, a user may exploit a PED and/or FED within an Enterprise 1060, for example, and access one of the first or second primary content servers 1090A and 1090B respectively to perform an operation such as accessing/downloading an application which provides DSAP features according to embodiments of the invention; execute an application already installed providing DSAP features; execute a web based application providing DSAP features; or access content. Similarly, a user may undertake such actions or others exploiting embodiments of the invention exploiting a PED or FED within first and second user groups 1000A and 1000B respectively via one of first and second cellular APs 1095A and 1095B respectively and first Wi-Fi nodes 1010A.

Figure 2:
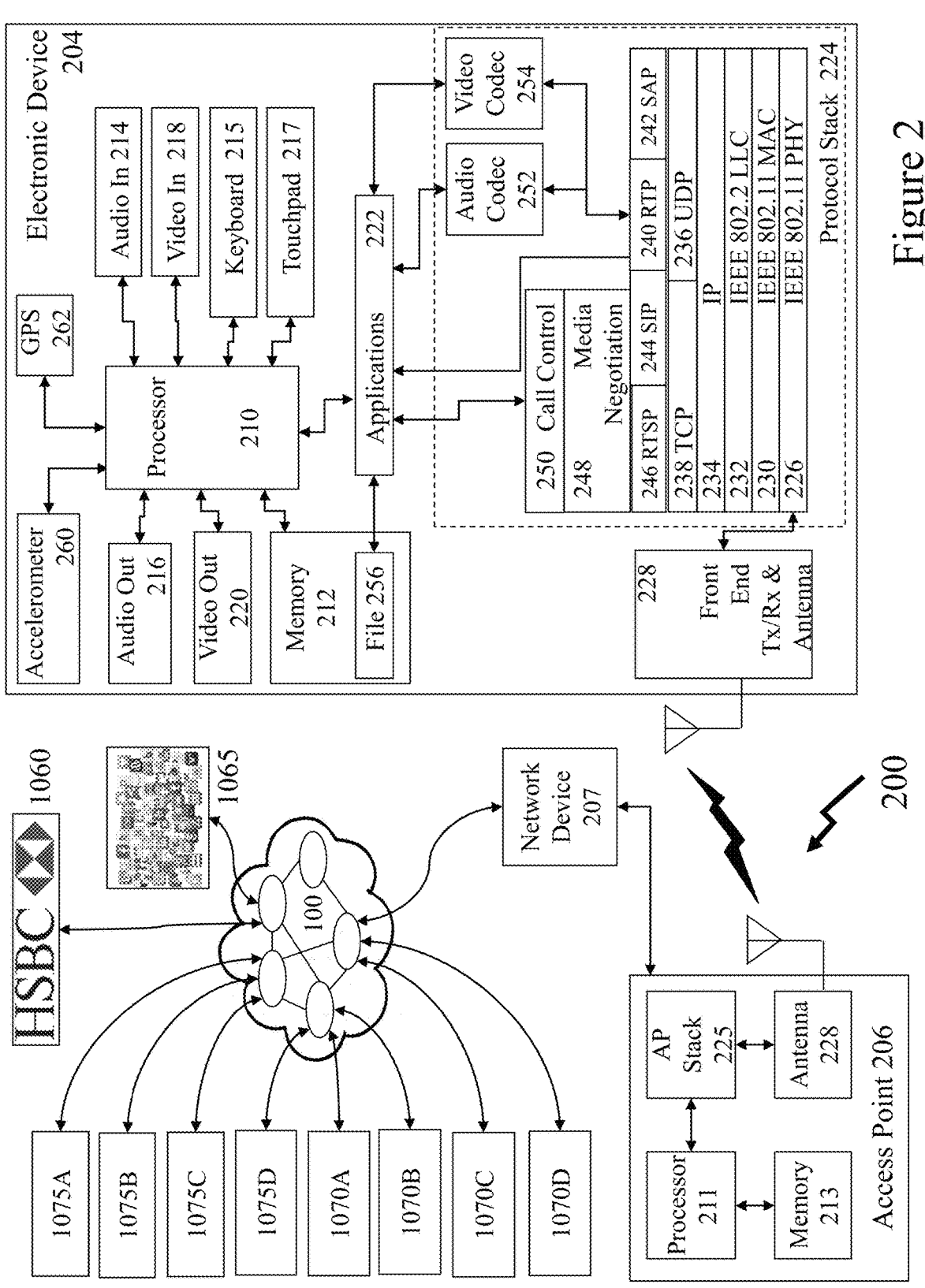
FIG. 2 depicts an electronic device supporting embodiments of the invention within the network environment depicted in FIG. 1.

Now referring to FIG. 2 there is depicted an electronic device 204 and network access point 207 supporting DSAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 1055, an access point (AP) 206, such as first AP 1010, and one or more network devices 207, such as communication servers, streaming media servers, and routers for example such as first and second servers 1090A and 1090B respectively. Network devices 207 may be coupled to AP 206 via any combination of networks, wired, wireless and/or optical communication links such as discussed above in respect of FIG. 1 as well as directly as indicated.

Also connected to the network 1000 are:

Social Networks (SOCNETS) 1065;

Original Equipment Manufacturer (OEM) 1070A, for example Google™, Samsung™, Apple™, etc.;

Manufacturer 1070B, for example Fitbit™, Microsoft™, LG™, etc.;

Retailer 1070C, for example Wal-Mart™, Target™, Walgreens™, Starbucks™, etc.;

Online retailer 1070D, for example Amazon™, JD.com, Otto™, etc.;

Website 1075A, for example Alibaba™, eBay™, etc.;

Service provider 1075B, for example Verizon™, Southern Company™, AT&T™ NextEra Energy™, etc.;

Third party service provider 1075C, for example Ernst & Young™, Moneris™, Ping Identity™, IBM™, etc.;

Enterprise 1075D, for example Wells Fargo™, Bank of America™, MasterCard™, Visa™ etc.; and First and second servers 1090A and 1090B which together with others, not shown for clarity.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Tx/Rx & Antenna Circuits 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206.

Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230. It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Figures 3, 4:
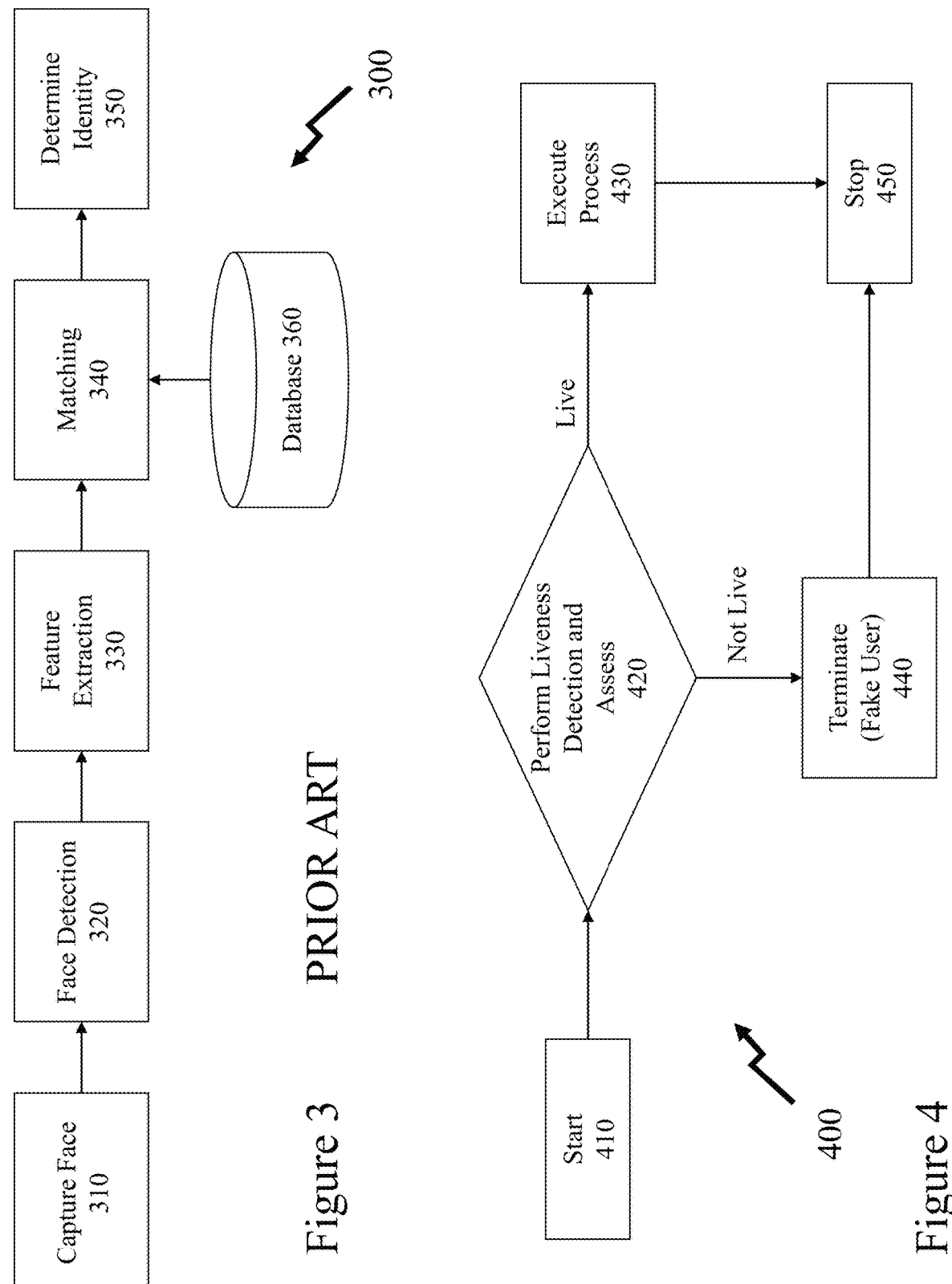
FIG. 3 depicts an exemplary process flow for liveness detection according to the prior art.
FIG. 4 depicts an exemplary process flow for liveness detection according to an embodiment of the invention.

Referring to FIG. 3 there is depicted an exemplary process flow 300 for liveness detection according to the prior art exploiting face recognition technology. As depicted the process flow comprises first to fifth steps 310 to 350 respectively in conjunction with a database 360. These steps being:

Capture Face 310 wherein a facial image of user is acquired from a camera;

Face Detection 320 where the face is detected from the acquired image with or without additional processing in order to normalize it, enhance it, etc. for further processing;

Feature Extraction 300 wherein facial recognition processing is performed in which the desired facial features are extracted;

Matching 340 wherein the extracted facial features are matched against the features stored in a database 360; and Determine identity 350 wherein the output of the facial recognition process is used to determine whether the acquired facial features match a stored set of facial features, i.e. is there a match or not, and where a match is identified to determine the identity of the person.

As noted previously spoofing is a major problem faced by biometric authentication systems. Biometric spoofing is a method of fooling a biometric system by presenting an artificial object to the scanner or sensor so that system will not be able to differentiate between a real object and an artifact. An attacker can attack at any stage, e.g. at the sensor level, feature level, matcher level etc. of biometric system. Typically, the sensor is the most vulnerable part of biometric system as it is its external interface and is accessible to every user. Such a sensor attack may exploit a physical artefact such as placing a fake finger comprised of some materials such as elastomer or rubber imprinted with a user's fingerprint for some fingerprint sensors or a plastic sheet with an image of the fingerprint for other sensors.

Another kind of attack in biometrics is the so-called "replay attack". In a replay attack, previously submitted biometric data of legitimate user is resent again and again to the system. Other attacks can include but are not limited to:

modifying the extracted features in feature extraction module by the attacker;

overriding the matcher and decision module by the attacker;

attacking the enrollment database by modifying or removing/adding templates in the database.

Equally, a face recognition system is also prone to the spoofing attacks. A user's biometric facial data can be easily stolen from social sites and other personal web sites. For example, a common attack on facial recognition systems is the photograph attack i.e. placing photographs in front of camera. Other facial spoofing attacks include playing video of a genuine user in front of the camera and using 3D dummy faces or masks.

Now referring to FIG. 4 there is depicted an exemplary process flow 400 for liveness detection according to an embodiment of the invention comprising steps 410 to 450. These steps being:

Start 410 wherein a liveness detection process is triggered, including for example, but not limited to, as part of user identification, entry authorization, authorization of a financial transaction, and authorization to access electronic assets or content;

Perform Liveness Detection 420 wherein a system exploiting embodiments of the invention performs a sequence of processes to acquire biometric and other data from the user to ascertain both the liveness of the user and the identity of the user;

Terminate 440 wherein a determination is made that at least one of the liveness of the user and the identity of the user are not those of a validated, verified or authenticated user and the process proceeds thereafter to stop at step 450;

Execute Process 430 wherein a determination is made that both the liveness of the user and the identity of the user are those of a validated, verified or authenticated user and the process proceeds to execute the process to which the validation, verification, or authentication are associated before proceeding to stop at step 450; and Stop 450.

Figure 5:
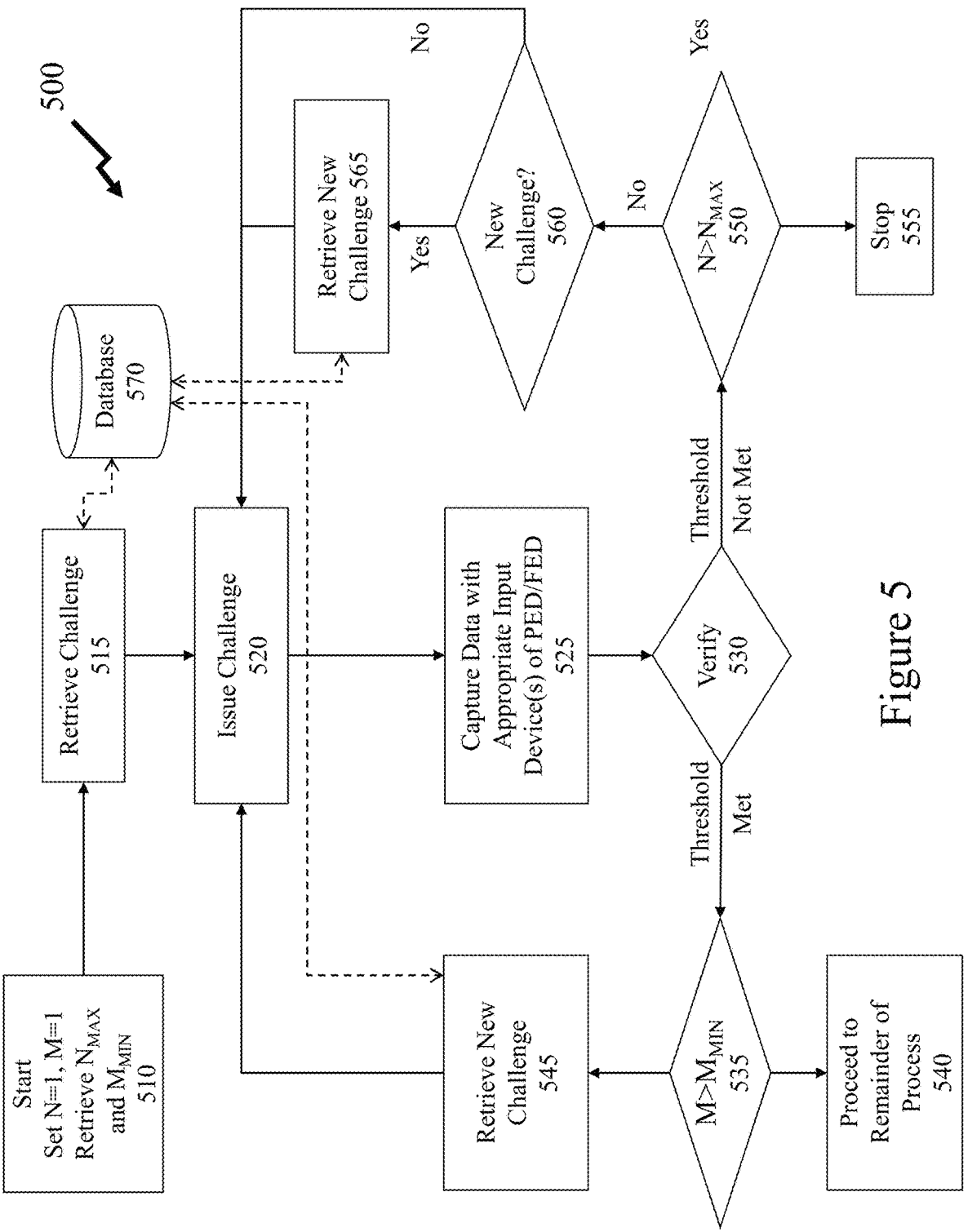
FIG. 5 depicts an exemplary process flow for liveness detection according to an embodiment of the invention.

Referring to FIG. 5 there is depicted an exemplary process flow 500 for liveness detection according to an embodiment of the invention comprising steps 510 to 555 in conjunction with a database 570 as may, for example, be employed in Perform Liveness Detection 420 within process flow 400 in FIG. 4.

Step 510 wherein the process is initiated and settings are established including, resetting counters N for a number of trials of a verification process to be attempted and M for the number of verification processes undertaken as well as the maximum number of trials of a verification process to be attempted, $N_{MAX}$ for the number of attempts or acquired responses to a specific challenge, and $M_{MIN}$ for the minimum number of verification processes to be employed.

Step 515 wherein the process retrieves a first challenge from the database 570.

Step 520 wherein the process issues the first challenge to the user.

Step 525 wherein the process captures data with the appropriate input device(s) of the user's PED and/or FED.

Step 530 wherein the process verifies the data captured and determines whether the threshold for the verification has been met or not met wherein it proceeds to steps 535 or 540 respectively.

Step 535 wherein the process determined that the verification threshold has been met and the process then determines whether the maximum number of challenges, $M_{MAX}$, have been met or not, if so the process proceeds to step 540 and if not, the process proceeds to step 545.

Step 540 wherein the process has determined that the minimum number of challenges, $M_{MIN}$, have been met, but as will become evident from the remainder of the process flow 500 all challenges must have been met, then the process proceeds to the remainder of the process within which the biometric authentication forms part.

Step 545 wherein the process has determined that the minimum number of challenges, $M_{MIN}$, have not been met, but as will become evident from the remainder of the process flow 500 all challenges must have been met, then the process proceeds to retrieve a new challenge and return to step 520 to present the new challenge to the user.

Step 550 wherein the process has determined that the verification threshold had not been met or not, and now determines whether the maximum number of challenge attempts, $N_{MAX}$, has been reached and if so the process proceeds to step 555 and stops as a challenge has not been successfully met or proceeds to step 560 to determine whether a new challenge should be issued or not.

Step 555 wherein the process stops as a challenge has not been successfully responded to within the maximum number of challenge attempts, $N_{MAX}$.

Step 560 wherein the process determines upon a failure to respond successfully to the current challenge whether to issue a new challenge or not. In some verification or authentication processes the user may be allowed to repeat a challenge wherein in other processes that is prevented wherein the process proceeds to step 520 either directly if the process issues the same challenge again or via step 565 wherein a new challenge is retrieved.

Step 565 wherein another challenge is retrieved from the database 570.

Figure 6:
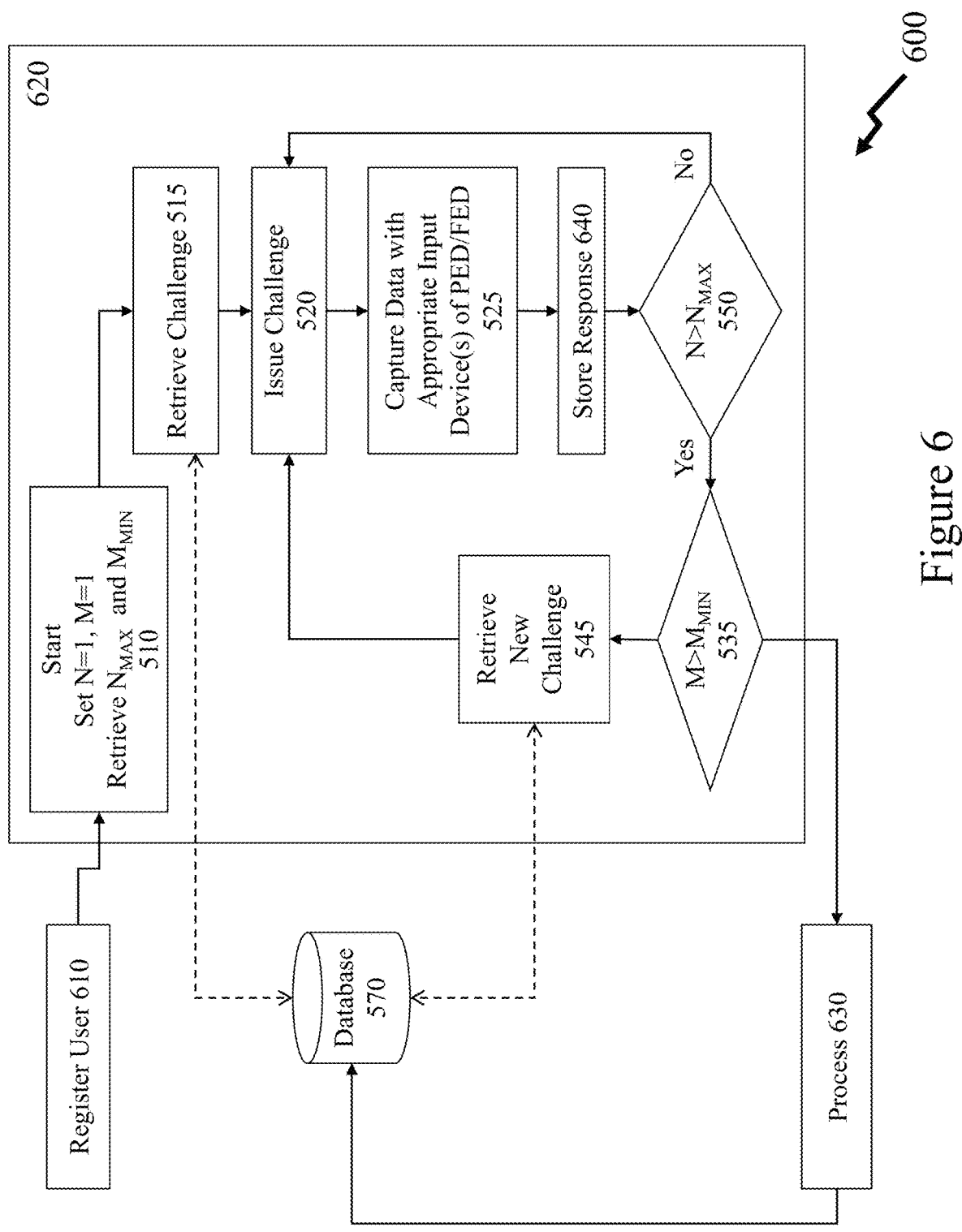
FIG. 6 depicts an exemplary process flow for registering a user to an authentication system with their provisioning of biometrics and data for subsequent liveness detection according to an embodiment of the invention.

Referring to FIG. 6 there is depicted an exemplary process flow 600 for registering a user to an authentication system with their provisioning of biometrics and data for subsequent liveness detection according to an embodiment of the invention. As depicted the process flow 600 comprises first and second steps 610 and 630 with a sub-flow 620. First step 610 comprises a user registering to a process comprising a biometric verification, authentication, or authorisation process, wherein the process proceeds to sub-flow 620 before processing in step 630. Sub-flow 620 is essentially the same as process flow 500 and comprises steps 510 to 550 with step 640 added between. Accordingly, the user is presented with a series of challenges, up to or exceeding a minimum number $M_{MIN}$, which are extracted for them to respond to wherein each challenge is answered $N_{MAX}$ times and the responses stored in step 640 each time. Once all $N_{MAX}$ responses have been provided to the at least $M_{MIN}$ challenges then process flow 600 processes all of these responses 630 are stored within the database 570 for subsequent use in the verification, authentication, authorisation processes such as described supra in FIG. 5.

Whilst the processes depicted in FIGS. 5 and 6 are presented with the user responding to provide $N_{MAX}$ responses for each challenge before progressing to the next challenge of the $M_{MIN}$ challenges it would be evident that the process may establish that there are $N_{MAX}*M_{MIN}$ challenges overall and pseudo-randomly progresses through them.

Figure 7:
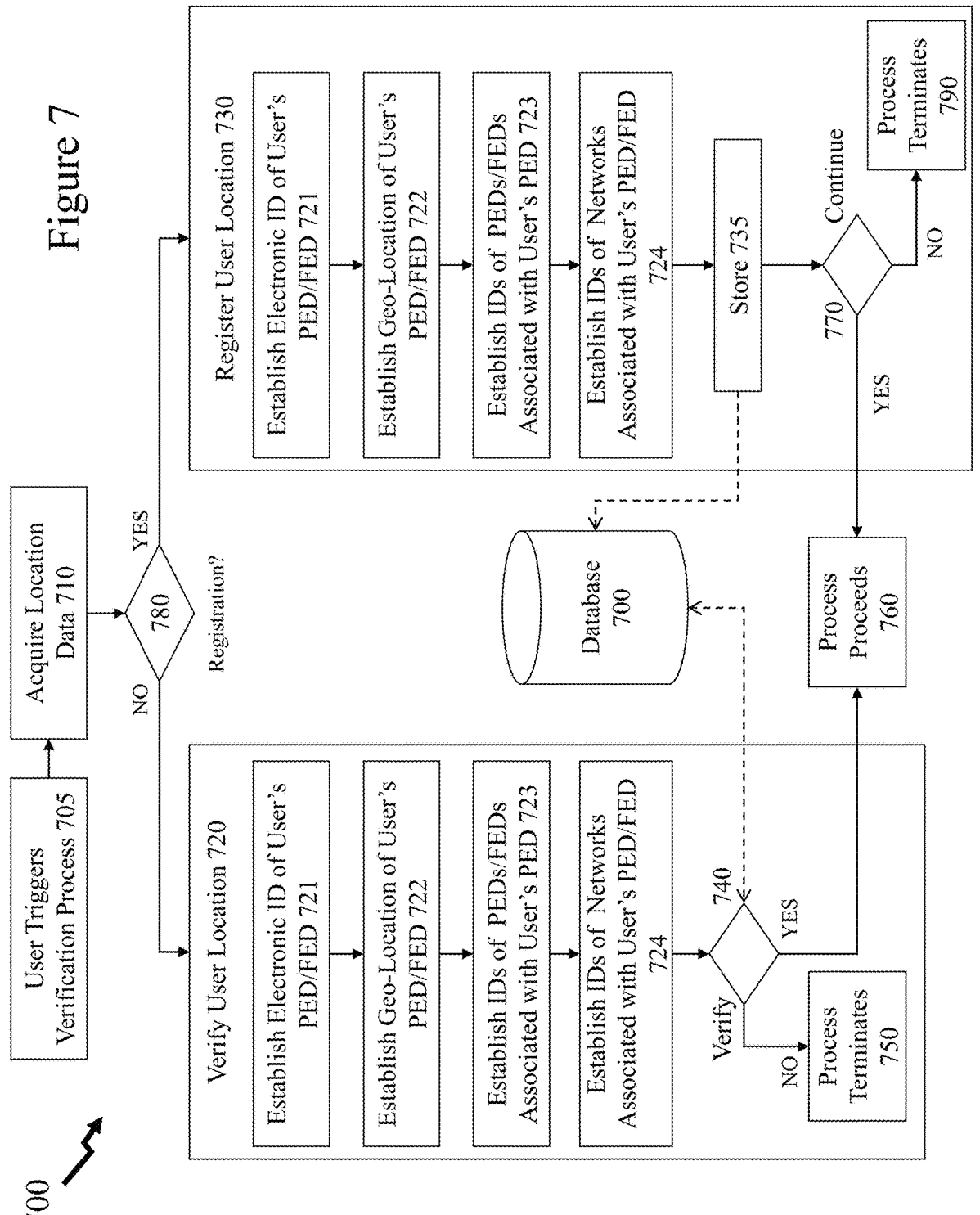
FIG. 7 depicts an exemplary process flow for registering and exploiting user location information within a liveness detection methodology according to an embodiment of the invention.

Now referring to FIG. 7 there is depicted an exemplary process flow 700 for registering and exploiting user location information within a liveness detection methodology according to an embodiment of the invention. As depicted process flow 700 presents first and second sub-flows 720 and 730 respectively for verification and registration processes including but not limited to those depicted and described in respect of FIGS. 5 and 6 respectively. Accordingly, the process begins at step 705 wherein the user triggers a verification process which then triggers acquisition of user location in step 710. At step 780 the process flow 700 determines whether the user location acquisition is part of a registration process or verification process. The verification process in first sub-flow 720 may form part of a liveness detection process as part of an authentication, verification and/or authorisation process. If part of a registration process exploiting second sub-flow 730 then this may be performed as part of a user registration process performed such as described in respect of FIG. 5 or where the user is performing a liveness verification at a location not previously registered wherein the once the liveness detection and the authentication, verification and/or authorisation process it forms part of has been performed the location data is acquired for a subsequent authentication, verification and/or authorisation process.

Each of the first and second sub-flows 720 and 730 respectively access the database 700 and include a final decision step, steps 740 and 770 respectively, that either result in the process terminating in steps 750 and 790 respectively or proceeding via step 760.

Referring to first sub-flow 720 this comprises first to fourth steps 721 to 724 together with first decision step 740, wherein the acquired location data is verified against the information within the database 700, and process termination step 750 if the verification fails. First to fourth steps 721 to 724 respectively comprise:

First step 721 wherein the electronic identity of the PED (or FED) employed by the user is acquired;

Second step 722 wherein geo-location data associated with the user's PED and/or FED at the point in time the liveness detection is performed is established;

Third step 723 wherein the identities of other PEDs and/or FEDs associated with the user's PED and/or FED are established; and Fourth step 724 wherein the identities of networks or network infrastructure associated with the user's PED and/or FED are established.

Referring to second sub-flow 730 this also comprises first to fourth steps 721 to 724 together with storage step 735 and second decision step 770 wherein a decision is made as to whether to proceed or not wherein the second sub-flow 730 proceeds to either process termination step 790 or process proceeds step 760. The storage step 735 results in the acquired location and identity data being stored within the database 700.

Accordingly, in addition to a liveness challenge or liveness challenges being required then the liveness challenge(s) may within embodiments of the invention be required to be performed in conjunction with one or more of:

an electronic device having an identity matching one previously stored;

upon an electronic device associated with one or more electronic devices whose identities have been previously stored;

upon an electronic device associated with one or more networks or network infrastructure whose identities have been previously stored; and a geo-location associated with the electronic device which has been previously stored.

Accordingly, for example, a user may establish a liveness challenge registration through a process, such as described and depicted in respect of FIGS. 6 and 7 respectively, wherein the registration is performed in their home with their personal PED and establishes:

that the user has a Fitbit™;

that their PED is associated via Bluetooth™ to a laptop;

that their PED is wirelessly associated with a Wi-Fi router in their home;

that their PED is wirelessly associated with a specific cell tower; and establishes the geo-location of the user's PED.

Accordingly, within embodiments of the invention if the user triggers a liveness challenge then the process, such as described and depicted in respect of FIGS. 5 and 7 respectively, then the process acquires:

the identity of the electronic device on which the liveness challenge is being performed;

the identities of electronic devices associated with the electronic device on which the liveness challenge is being performed;

the identities of one or more networks or network infrastructure associated with the electronic device on which the liveness challenge is being performed; and the geo-location associated with the electronic device on which the liveness challenge is being performed.

Then as indicated in respect of FIGS. 5 and 7 this data is employed in conjunction with the responses from the liveness challenges.

Within embodiments of the invention the liveness challenges may include, but not be limited to:

Biometric data acquisition;

Haptic challenges;

Sensor acquisition;

Sense based triggers and responses;

Memory challenges; and

Challenges presented through non-electronic device paths.

Biometric Challenges:

Biometric challenges exploit characteristics of the user, these may include, but not be limited to, fingerprint(s), hand geometry, palm print/imaging, skin texture/colour, eye colour, facial recognition, facial expressions, ear geometry, odor, scent, gait, voice, iris scanning, and retinal scanning.

Fingerprint: A challenge is provided identifying a specific finger or thumb to be scanned with a fingerprint sensor forming part of the PED/FED or connected to the PED/FED. This fingerprint sensor may exploit one or more techniques including, but not limited to, optical, capacitive, radio frequency (RF), thermal, piezoresistive, ultrasonic, piezoelectric, and microelectromechanical systems (MEMS). Fingerprint analysis for matching purposes generally requires the comparison of several features of the print pattern which may include, but not limited to, an aggregate characteristic of ridges and minutia points, which are unique features found within the patterns. Fingerprint challenges may be employed discretely or in combination with other challenges.

Accordingly, the user may have previously stored scans for all of their fingers and both thumbs such that irrespective of the finger or thumb identified in the challenge the data for the user is stored within the database. The acquired data with respect to the ridges and minutia points and hence the challenge(s) may relate to the fingertip, anterior digital regions, posterior digital regions, and posterior proximal interphalangeal regions. Optical imaging may include, the anterior interphalangeal folds such as distal, middle and proximal, first to fourth interdigital spaces, posterior digital regions, posterior distal interphalangeal regions, and knuckles.

Hand Geometry and/or Palm Print/Imaging: A challenge is provided identifying a specific region of the user's palm or wrist which is acquired through an optical image and scaled relative to the user's hand, for example. Such regions may include, but not be limited to, the thenar eminence region, hypothenar eminence region, median palmar region, hypothenar region, palmar region, palmar creases such as distal transverse, proximal transverse, thenar, radial longitudinal, distal wrist crease, and proximal wrist crease. Hand geometry and/or palm print/imaging may be employed discretely or in combination with other challenges.

Skin Texture/Colour: In response to a challenge an optical image of a region of the user's body may be acquired and a spectral profile established which is matched against a spectral profile on record in respect of the region identified in the challenge.

Eye Colour: In response to a challenge an optical image of the user's eye is acquired, and a spectral profile established which is matched against a spectral profile on record in respect of the user's eye identified in the challenge, e.g. their left or right. Eye Colour Facial Geometry and/or Facial Expression: Facial geometry and/or facial expression may be established based upon images acquired of the user's face which may be acquired with the user performing one or more facial expressions such as smiling, frowning, blinking, etc. and with their head in one or more orientations. The user may be asked to perform a specific sequence of facial expressions in one or more orientations wherein only the verification system knows which expressions, regions of the user's face etc. are involved within the verification. The sequence may be varied for each challenge and used discretely or in combination with other challenges.

Ear Geometry: Ear geometry may be established based upon images acquired of the user's ear and employed discretely or in combination with other challenges.

Odour and/or Scent: Each individual has their own odor which, whilst it can vary through disease, diet change or even the mood swings, has underlying recognizable patterns that remain. Accordingly, a multi-analyte gas sensor or mass spectrometer may be employed to provide an odor profile in response to the challenge.

Typing Rhythm: Typing rhythm varies with the user, the keyboard they are employing, and the word(s), number(s), or phrase(s) they are typing. Accordingly, the challenge may comprise requesting the user type a presented challenge and extracting not only whether the challenge is responded to appropriately (or this aspect is ignored) and the typing rhythm of the response is determined and employed to determine a valid response to the challenge. This challenge may also be one where the user is required to enter the challenge response several times and the changes in rhythm determined. Alternatively, the phrase(s) and/or word(s) may be acquired from the user's normal activities such as email, texting (short message service), etc.

Gait: A challenge may be issued requiring the user to walk, jog, run, hop, a certain distance or number of steps, hops, etc. The resulting gait of the user performing this challenge is compared to stored gait data for the user. Optionally, the application may be acquiring gait data over a period of time prior to the verification, authentication or authorisation process being triggered. The gait data may therefore be stored continually by an application in execution upon the PED and downloaded wherein it is analysed to extract a period of the user walking and this portion compared to the stored data. Accordingly, the application may seek data an hour, a few hours, a day, a few days prior to the authorisation, verification, authentication process.

Voice: Vocal recognition may exploit matching of a phrase, phrases, word(s) etc. identified within a challenge to responses previously provided to the user during a registration process. Optionally, the words may be within a phrase or portion of text to be read by the user wherein the word(s) are selected by the application from the phrase or portion of text rather than a simple replication of a specific phrase(s) or word(s). Alternatively, the phrase(s) and/or word(s) may be acquired from the user's normal activities such as telephony.

Iris and/or Retinal Imaging: Iris recognition based biometric systems may apply mathematical pattern-recognition techniques to images of the iris or irises of an individual's eye or eyes as the complex patterns are unique, stable, and can be seen from some distance. Alternatively, retinal scanning is an ocular-based biometric technology that uses the unique patterns on a person's retina blood vessels within their eye.

Within embodiments of the invention a biometric challenge may be combined with one or other challenges including, but not limited, to another biometric challenge or challenges, a haptic challenge or challenges, acquired sensor data in response to a challenge or challenges, responses to sense based challenge or challenges, and/or a memory challenge or challenges.

Haptic Challenges:

Within embodiments of the invention the user providing a response or responses to one or more challenges as part of a verification, authorisation, and/or authentication process. These challenges may include one or more haptic challenges. Such haptic challenges may include a biometric challenge such as gait or typing rhythm. However, other haptic challenges may include, but not be limited to, those allowing determination of a liveness with or without establishing the unique identity of the user which may be established through other challenges.

For example, where the user is performing the verification, authorisation, and/or authentication process in association with a FED then the user may be required to undertake a series of motions with respect to their FED, e.g. using image processing to determine the user raising and lowering their arm, twisting their head, bending over, turning around, bending their arm, clapping their hands, blinking, opening/shutting their eyes, or opening/shutting their mouth or a combination thereof or other combinations of haptic challenge.

For example, where the user is performing the verification, authorisation, and/or authentication process in association with a PED then the user may be required to undertake a series of motions with respect to their PED, e.g. using a motion sensor, accelerometer, image processing to determine the user raising and lowering their arm, twisting their head, bending over, turning around, bending their arm, clapping their hands, blinking, opening/shutting their eyes, or opening/shutting their mouth or a combination thereof.

For example, the user may be tasked to turn around holding their PED and blinking a specific number of times; waving their PED and performing a biometric challenge; turn the PED to a predetermined angle wherein the PED automatically acquires an image and captures audio as the user recites a passage; or a combination thereof or other combinations of haptic challenge.

Sensor Acquisition:

Within embodiments of the invention the user providing a response or responses to one or more challenges as part of a verification, authorisation, and/or authentication process. These challenges may include obtaining data from one or more sensors associated with the PED and/or FED the user is employing in order to perform the verification, authorisation, and/or authentication process upon. This sensor acquisition is considered additional to the data acquired with one or more sensors providing biometric data with respect to the one or more challenges such that the additional data acquired from these sensors augments the responses from the challenges to provide liveness detection atop of user verification.

Dual Camera Acquisition: Many PEDs comprise cameras on both the same side as the optical display and the reverse side. Accordingly, as the user will be viewing the display in order to execute the verification, authorisation, and/or authentication process and view the challenges then the additional sensor data may comprise image data acquired from the camera facing the user and/or the facing away from the camera. For example, the registration process when a user is registering at a specific location may acquire the image data behind the user as an image is captured may be stored as well as an image or images acquired with the other camera of their surroundings around them. This may include, for example, having the user capture one or more landscape images during registration wherein the verification, authorisation, and/or authentication process automatically acquires data from both cameras during the challenges so that the data from both for a registered location can be processed and employed. Accordingly, as part of the liveness processing and/or challenge processing the application automatically acquires the data from both cameras and may automatically fail a challenge if data from the camera facing away from the user which is known to be present upon the user's PED is not acquired.

Microphone/Loudspeaker: During acquisition of data relating to the challenges the microphone of the PED and/or FED may be activated independent of whether the microphone is employed in any challenge(s). In a manner similar to that with the camera acquisition audio data may be acquired during the one or more challenges as part of the verification, authorisation, and/or authentication process which is employed as part of the liveness processing and/or challenge processing. This may include, but not be limited to, analysing background sounds for consistency between registration and challenge such as may occur with traffic noise, for example. Alternatively, the acquired audio data may be processed for additional vocal content which may be assessed. Optionally, audio may be acquired during the entire the verification, authorisation, and/or authentication process or as part of liveness processing and/or challenge processing or registration processing. Keyword extraction may identify vocal content consistent with the verification, authorisation, and/or authentication or vocal content inconsistent with the verification, authorisation, and/or authentication process. Optionally, the microphone may be employed in conjunction with the loudspeaker of the PED/FED or with a loudspeaker forming part of a headset, headphones, earpiece etc. in order to detect acoustic content generated by the loudspeaker. Where the headset, headphones, earpiece etc. exploit a wireless protocol, e.g. Bluetooth, then the challenge may be sent to the headset, headphones, earpiece etc. employed in the registration process or the detection of acoustic signals generated by a microphone forming part of the PED etc. detected. This may be "polled" so that only if the identity of the associated headset, headphones, earpiece etc. matches that of the headset, headphones, earpiece etc. at registration then the challenge is issued. As the identity of the user's PED/FED may be established at registration then the acoustic challenge may be sent to that device irrespective of the PED/FED upon which the verification, authorisation, and/or authentication process has been initiated.

Heart Rate Monitor: The user performing the verification, authorisation, and/or authentication process may have associated with their PED/FED one or more wearable devices such as a fitness tracker, smart watch etc. which may include one or more sensors providing biometric data, location data, etc. As noted in respect of FIG. 7 when a user registers a location then the wearable devices may be associated and accordingly if these are not present when the user seeks to perform the verification, authorisation, and/or authentication process then the process fails. However, where these are present then the wearable devices may be employed to generate additional data in respect of a challenge or challenges. For example, a heart rate or breathing sensor may detect a fear response of the user when presented they are presented with an image, sound, video etc. associated with a fear of the user identified and stored during the user's registration process. The element provoking fear may be embedded as part of a series of elements presented to the user so that normal biometrics and fear response are detected and/or to obfuscate the element associated with the fear. As a response such as fear is automatic then the biometric acquisition may be established as being within a predetermined period of time of the element associated with the fear being presented. Accordingly, as such reaction times of the user are rapid an attacker will have trouble synthesizing a response even with modern hardware and advanced algorithms to simulate the user's heart rhythm, for example, during the presentation of elements not triggering the fear response and then the response to the fear factor.

Location: For most individual's their regular daily life has a particular routine whether as an adult, teenager, etc. For example, a teenager will have a weekday routine when school/college are "in" determined by the schedule of their school/college and will typically leave their residence, travel, attend, etc. For an adult working then typically their routine is similarly structured during the week. Accordingly, the application may acquire at predetermined time points, such as established by a process generating pseudo-random time intervals for example, over an extended period of time location data which is employed in verifying that the PED and/or FED upon which the verification, authorisation, and/or authentication process is triggered is the user's PED. Accordingly, the data acquired is periodically transmitted to a remote server wherein it is checked/verified against data extracted from the PED/FED upon which the verification, authorisation, and/or authentication process is being performed. Accordingly, the attacker requires not only appropriate responses to the challenges for the liveness detection but also historical data on the user's movements which only exist upon the specific PED/FED the user registered for the verification, authorisation, and/or authentication process.

Sense Based Triggers and Responses:

Within embodiments of the invention the user providing a response or responses to one or more challenges as part of a verification, authorisation, and/or authentication process may exploit haptic interfaces to enter responses, exploit their vision to acquire the challenge(s), exploit their hearing to acquire the challenge(s), and exploit their vocal sense to provide responses to the challenge(s). However, the user generally has five senses and accordingly whilst sight, sound, and touch are commonly employed taste and smell are less common as triggering responses exploiting these senses is typically more complex that exploiting a microphone and/or loudspeaker for sound, a display for vision, and a keyboard or touch sensitive screen for touch (entering text).

Within embodiments of the invention a user may be provided with a sheet of sense triggers comprising a plurality of sense trigger elements which are uniquely serial numbered wherein the challenge identifies a unique serial number for a sense trigger element of the sheet of sense triggers. The user may be provided with the sheets of sense triggers automatically by an organization/enterprise, e.g. their financial institution, such that the organization/enterprise exploiting the verification, authorisation, and/or authentication process for a financial transaction such that the unique serial numbers are known to the verification, authorisation, and/or authentication process. Accordingly, each sense trigger element may be either a taste element and/or a smell element wherein the user either uses their tongue and/or nose accordingly to provide the response to the challenge.

Memory Challenges:

Within embodiments of the invention the user providing a response or responses to one or more challenges as part of a verification, authorisation, and/or authentication process may exploit a memory challenge as one or more of the challenges provided to the user.

For example, the memory challenge may be based upon a prior verification, authorisation, and/or authentication process with the same institution/organization/enterprise such as which vendor/service provider did the process relate to, what was acquired, the value, when did the process occur, where did the user perform the process, etc.

Optionally, the memory challenge may be based upon other prior activities of the user. These may, for example, include but not be limited to where was the user at a predetermined point in time; an identity of a place, event, individual within content associated with the user such as posted by the user to a SOCMED or SOCNET or posted by another individual to the SOCMED or SOCNET where the posting identifies the user, or the user is associated to the individual via the SOMED or SOCNET. Alternatively, the memory challenge may be based upon the user's personal history etc.

Within embodiments of the invention a challenge may be issued with or without a time limit for the response. Generally, the time required for a user to respond to a challenge is not only relatively long but also varies among individuals. Accordingly, whilst attackers can synthesize responses faster than legitimate users by using modern hardware and advanced algorithms their responses to one or more challenges may be temporally disjointed to the temporal responsivity of the user. Such temporal factors may be established, for example, during registration such that the typical response time of a user to a movement challenge, a recognition challenge, a memory challenge, etc. is established. Therefore, if the typical response for a user's movement challenge is between 250 milliseconds (ms) and 400 ms then the challenge response may be ignored if it is made earlier than a predetermined buffer relative to the user's minimum response time, e.g. 25 ms, and made later than a second predetermined buffer relative to the user's maximum response time, e.g. 50 ms. Accordingly, the movement challenge response must be made within 225 ms and 450 ms of issuance for it to be processed.

Depth Detection

Within embodiments of the invention described above a system determining whether a use providing data is "live" or not may exploit a number of methodologies as well as sensors, information sources etc. Amongst, these is facial recognition but as noted above prior art facial recognition methods can be "spoofed" or provided with false information providing a false positive determination by exploiting an image of the user. Accordingly, it would be beneficial to provide a real time determination of whether the image(s) being presented are of a real three dimensional (3D) face rather than a two dimensional (2D) image.

Figure 8:
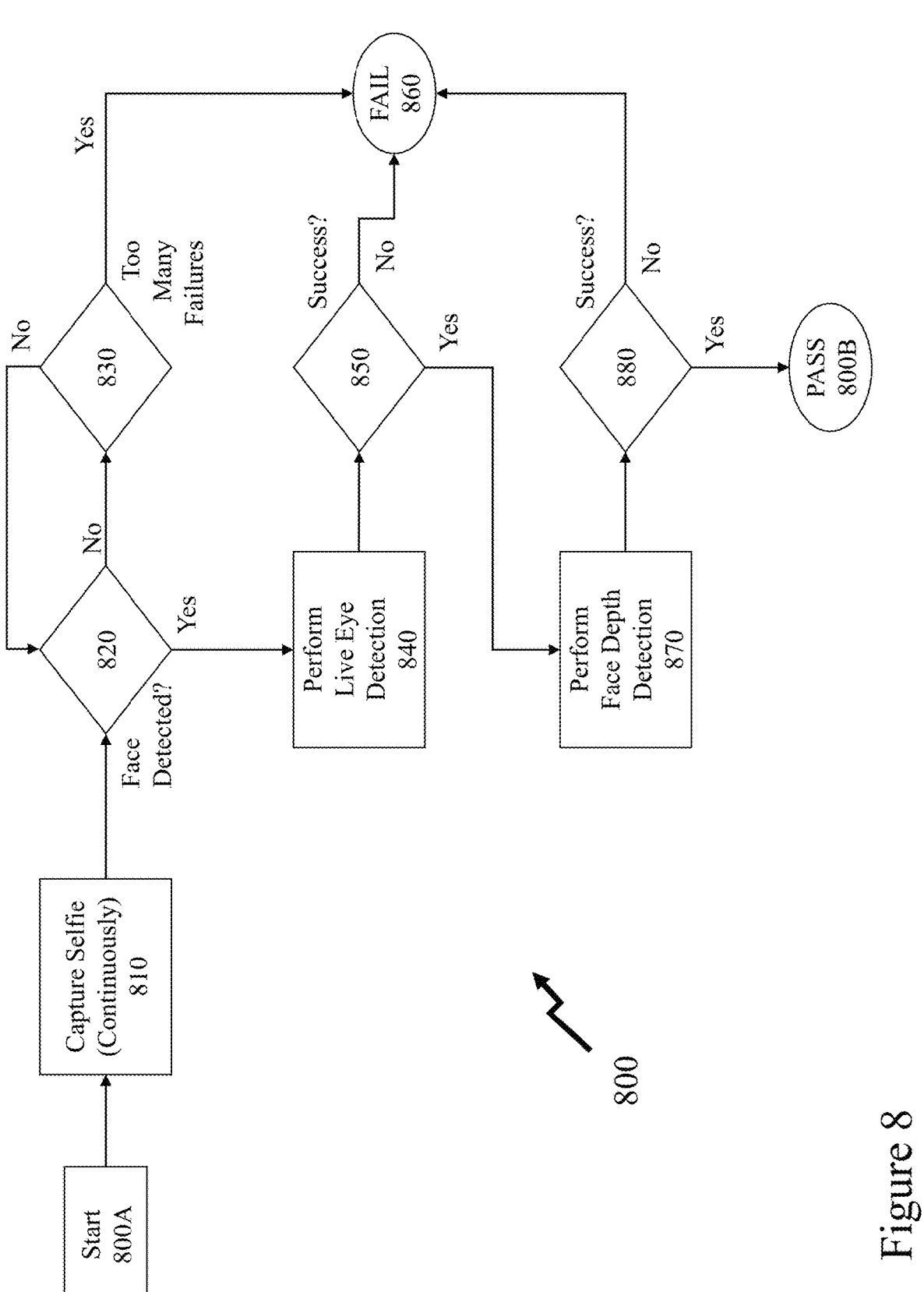
FIG. 8 depicts an exemplary process flow for liveness detection according to an embodiment of the invention.

Referring to FIG. 8 there is depicted an exemplary process flow 800 for liveness detection according to an embodiment of the invention. Accordingly, as depicted the process comprises first to eighth steps 810 to 880 respectively, starts at step 800A and either terminates at step 800B with a pass at step 800B or sixth step 860. These first to eighth steps 810 to 880 respectively comprising:

First step 810 wherein a camera forming part of a PED or FED upon which a user is performing a verification/validation process comprising a determination that the user is "live."

Second step 820 wherein the process performs an initial step of determining that a face is present within the image(s) acquired where failure to detect a face within the image(s) prevents the process initiating and the process proceeds to third step 830 otherwise the process proceeds to step 840.

Third step 830 wherein the process determines how many failures in the current process there have been and if the process determines that the number exceeds a predetermined threshold it proceeds to sixth step 860 wherein the process fails otherwise it proceeds back to second step 820.

Figure 9:
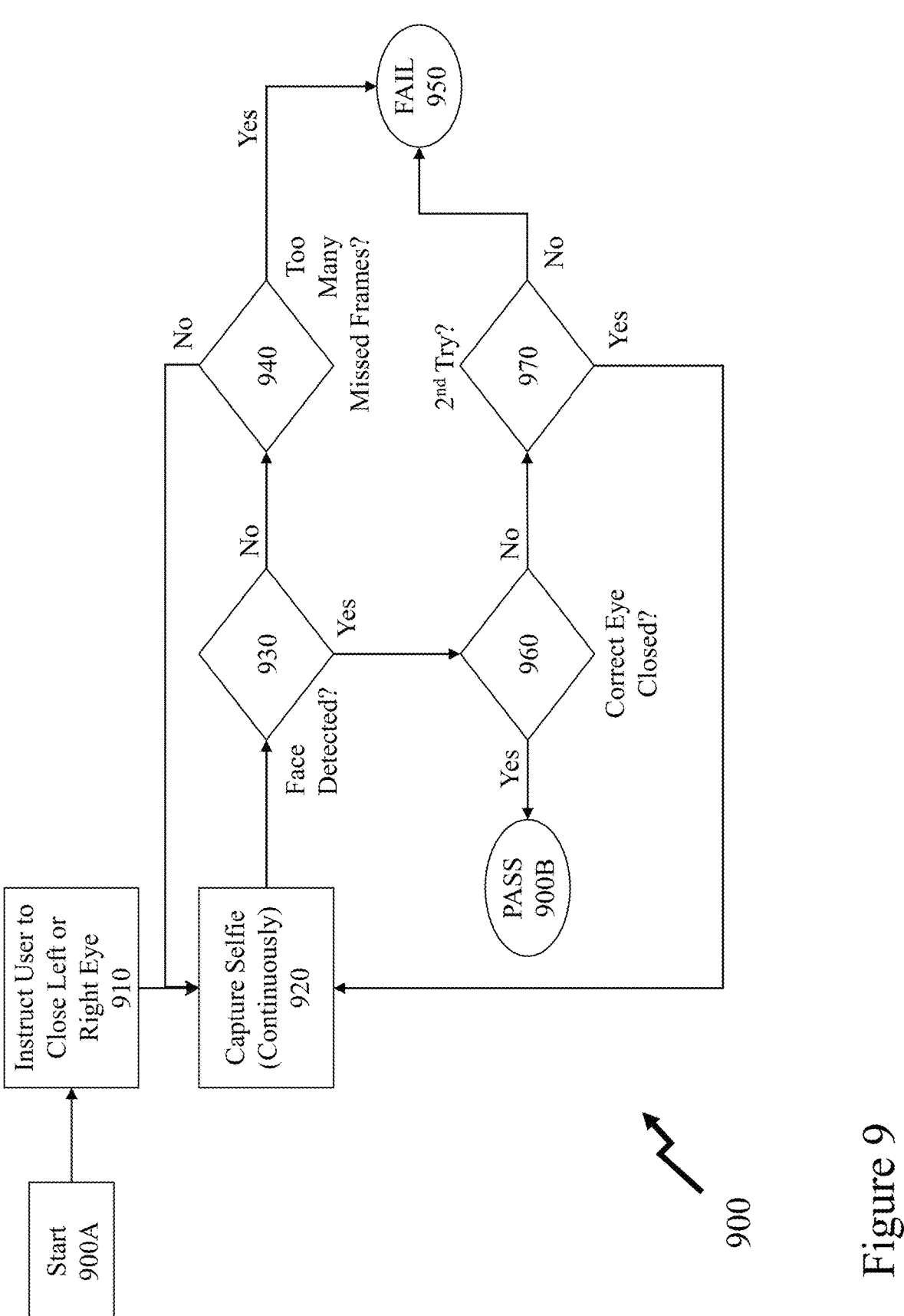
FIG. 9 depicts an exemplary process flow for live eye detection during a liveness detection according to an embodiment of the invention.

Fourth step 840 wherein the process performs live eye detection, for example using a process such as described and depicted in FIG. 9 with process flow 900, and proceeds to fifth step 850.

Fifth step 850 wherein the process determines whether the live eye detection in fourth step 840 was successful or not and proceeds to either sixth step 860 wherein the process fails or proceeds to seventh step 870.

Sixth step 860 wherein the process determines a fail and stops.

Seventh step 870 wherein the process performs face depth detection before proceeding to eighth step 880.

Eighth step 880 wherein the process determines whether the face depth detection in seventh step 870 was successful or not and proceeds to either sixth step 860 wherein the process fails or proceeds to pass at step 800B.

Within embodiments of the invention the resulting face depth information may be compared to stored face depth information relating to the user allowing a determination as to whether the face from which the face depth information is extracted is the same as that of the user initially established during an initial setup process for the user. Accordingly, a user may, for example, when setting up an authorisation process provide initial reference images sets from which the baseline facial depth information is extracted and stored prior to be used as the reference datum against which subsequent liveness detections are performed. For example, a user setting an online verification process may provide initial images through a process on their PED and/or FED. Alternatively, for verifications such as at automatic teller machines (ATMs) for example the process may be performed using a reference ATM at branch where the user provides additional documentation, such as government issued identity documents.

Now referring to FIG. 9 there is depicted an exemplary process flow 900 for live eye detection during a liveness detection according to an embodiment of the invention. Accordingly, as depicted the process comprises first to seventh steps 910 to 970 respectively, starts at step 900A, and either terminates at step 900B with a pass or fifth step 950. These first to seventh steps 910 to 970 respectively comprising:

First step 910 wherein the process in execution upon a PED or FED upon which a user is performing a verification/validation process comprising a determination that the user is "live" prompts the user to close their left or right eye.

Second step 920 wherein the process performs a continuous capture of a "selfie" as it is known with a camera forming part of the PED or FED directed towards the user.

Third step 930 comprising determining that a face is present within the image(s) acquired where failure to detect a face within the image(s) prevents the process initiating and the process proceeds to fourth step 940 otherwise the process proceeds to sixth step 960.

Fourth step 940 wherein the process determines how many failures in the current process there have been and if the process determines that the number exceeds a predetermined threshold it proceeds to fifth step 950 wherein the process fails otherwise it proceeds back to second step 920.

Fifth step 950 wherein the process determines a fail and stops.

Sixth step 960 wherein the process processes the acquired images and determines whether the user closes an eye and whether the correct eye for which they were prompted was closed before proceeding to seventh step 970. As the user may similarly present a video upon being challenged with a 50% probability of having the correct eye to meet a single prompt it would be evident that the process may request the user to perform a sequence of eye closings/openings such as left (L), right (R), left (L); RRL; LLR; LLRR; etc. Accordingly, the process determines whether the correct eyes and correct eye closing sequence were provided by the user in sixth step 960 or not and proceeds to either seventh step 970 or proceeds to pass at step 800B.

Seventh step 970 wherein it is determined whether the user is to be provided with a second try or not. If not, the process proceeds to step 950 and fails or proceeds back to second step 920. Optionally, within other embodiments of the invention the process may provide the user with a predetermined number of tries and counts these wherein seventh step 970 determines whether the predetermined number of tries has been exceeded, e.g. three, four, etc.

Optionally, within embodiments of the invention there may be either a time limit associated with the acquisition of the images to determine the eye closing sequence and/or a time limit associated with completing the verification of the eye closing sequence with multiple attempts.

Figure 10:
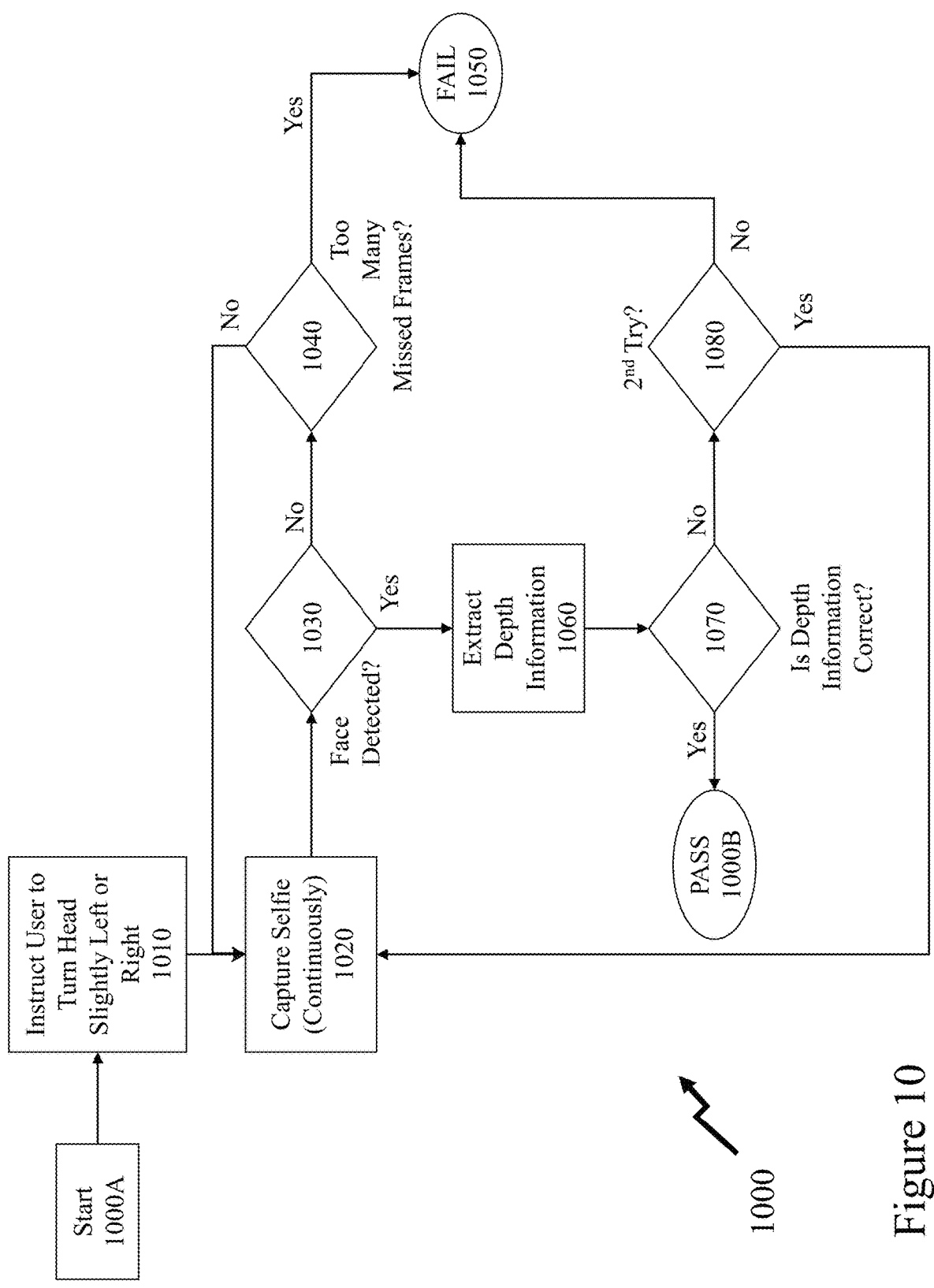
FIG. 10 depicts an exemplary process flow for face depth detection during a liveness detections according to an embodiment of the invention.

Referring to FIG. 10 there is depicted an exemplary process flow 1000 for face depth detection during a liveness detections according to an embodiment of the invention. Accordingly, as depicted the process comprises first to eighth steps 1010 to 1080 respectively, starts at step 1000A and either terminates at step 1000B with a pass at step 1000B or sixth step 1050. These first to eighth steps 1010 to 1050 respectively comprising:

First step 1010 wherein the process in execution upon a PED or FED upon which a user is performing a verification/validation process comprising a determination that the user is "live" prompts the user to turn their head slightly to their left or right.

Second step 1020 wherein the process performs a continuous capture of a "selfie" as it is known with a camera forming part of the PED or FED directed towards the user.

Third step 1030 comprising determining that a face is present within the image(s) acquired where failure to detect a face within the image(s) prevents the process initiating and the process proceeds to fourth step 1040 otherwise the process proceeds to sixth step 1060.

Fourth step 1040 wherein the process determines how many failures in the current process there have been and if the process determines that the number exceeds a predetermined threshold it proceeds to fifth step 1050 wherein the process fails otherwise it proceeds back to second step 920.

Fifth step 950 wherein the process determines a fail and stops.

Sixth step 1060 wherein the process extracts depth information from the acquired images, for example using a process such as described and depicted in FIGS. 11 to 16 before proceeding to seventh step 1070.

Seventh step 1070 wherein the process processes the extracted depth information and determines whether this matches stored depth information. Accordingly, a user may, for example, when setting up an authorisation process provide initial reference images sets from which the baseline facial depth information is extracted and stored prior to be used as the reference datum against which subsequent liveness detections are performed. For example, a user setting an online verification process may provide initial images through a process on their PED and/or FED. Alternatively, for verifications such as at automatic teller machines (ATMs) for example the process may be performed using a reference ATM at branch where the user provides additional documentation, such as government issued identity documents. Upon a positive determination the process proceeds to pass in step 1000B or proceeds to step 1080.

Eighth step 1080 wherein it is determined whether the user is to be provided with a second try or not. If not, the process proceeds to step 1050 and fails or proceeds back to second step 1020. Optionally, within other embodiments of the invention the process may provide the user with a predetermined number of tries and counts these wherein eighth step 1080 determines whether the predetermined number of tries has been exceeded, e.g. three, four, etc.

Figure 11:
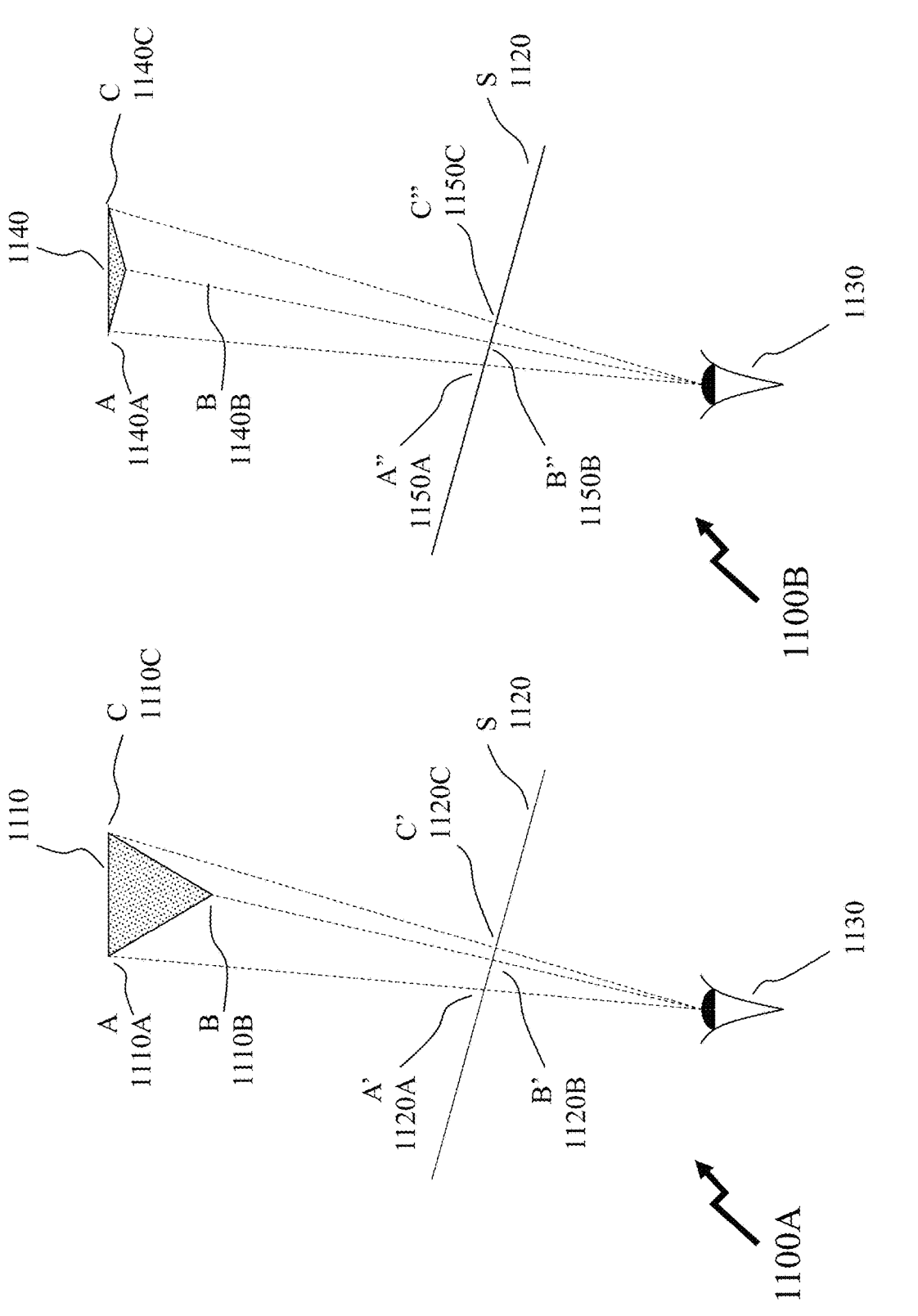
FIG. 11 depicts schematically the concept behind depth detection according to an embodiment of the invention.

Now referring to FIG. 11 there is depicted schematically with first and second images 1100A and 1100B the concept behind depth detection according to an embodiment of the invention. Referring to first image 1100A a user's eye 1130 views a first object 1110. Accordingly, considering first to third points 1110A to 1110C on the first object 1110 then three rays can be drawn from these points to the user's eye 1130. These rays intersecting a plane S 1120 at first to third intercept points A' 1120A, B' 1120B, and C' 1120C respectively. Now referring to second image 1100B the user's eye 1130 views a second object 1140. Accordingly, considering first to third points 1140A to 1140C on the second object 1140 then three rays can be drawn from these points to the user's eye 1130. These rays intersecting the plane S 1120 at first to third intercept points A" 1150A, B' 1150B, and C' 1150C respectively. Accordingly, it is evident that the relative positions of the first to third intercept points A" 1150A, B' 1150B, and C' 1150C respectively with the smaller second object 1140 are different to those of first to third intercept points A' 1120A, B' 1120B, and C' 1120C respectively with the first object 1110.

It would also be evident that first to third intercept points A' 1120A, B' 1120B, and C' 1120C respectively would have a different relative spacing and positions with respect to first to third intercept points A" 1150A, B" 1150B, and C" 1150C respectively when the first and second objects 1110 and 1140 are the same object but are rotated relative to the user's eye 1130 in different orientations. Accordingly, where the user's eye 1130 is a camera and the user's head is rotated the relative depth of different regions of the user's face, e.g. nose, eye sockets, etc., can be established.

Figures 12, 13:
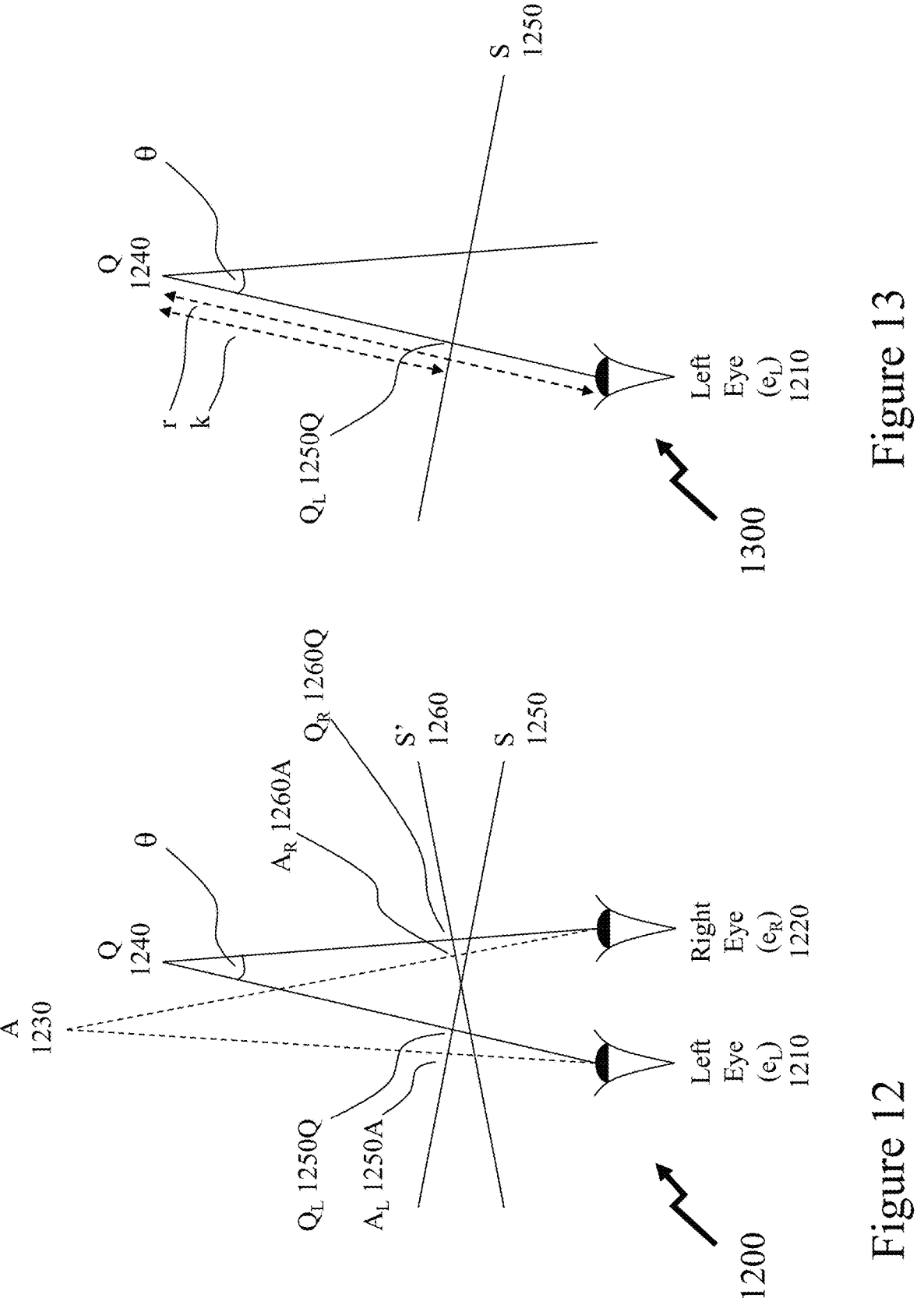
FIG. 12 depicts schematically the depth calculations within the concept of depth detection according to an embodiment of the invention.
FIG. 13 depicts the depth detection parameters employed within the depth calculations with the concept of depth detection according to an embodiment of the invention.

Accordingly, referring to FIG. 12 and considering an array of points Q 1240 with respect to the user's left eye ($e_L$) 1210 and right eye ($e_R$) 1220 then we have a series of inputs, namely k, Q, $\{(a_L, a_R)\}$, $e_L$, and $e_R$ allowing calculation of a set $\{A_i\}$ of points A 1230. Considering, Q, r, k, and theta then we make some assumptions as given by Equations (1) to (3).

$$Q \text{ is a centroid of rotation (e.g. the user's shoulder)} \quad (1)$$

$$r = |Q - e_R| = |Q - e_L| \quad (2)$$

$$S \text{ is a line perpendicular to } (Q-e) \text{ at a distance } k \text{ from } e \quad (3)$$

Accordingly, we can establish relationships defined by Equations (4) to (6) respectively which are then solved for m to yield the relationships in Equation (7) to (10) respectively. Accordingly, these are solved for $w_L$ and $w_R$ using both eye locations. Performing this for each pair of $(a_L, a_R)$ results in the set $\{A_i\}$ which can then be tested for flatness.

$$q = (Q - e)/|Q - e| * k/r \quad (4)$$

$$a = q + m * s, \text{ where } s \text{ is a direction of } S \quad (5)$$

$$s = [(Q - e)/|Q - e| * R_{90}], \text{ where } R_{90} \text{ is a rotation matrix} \quad (6)$$

$$A = e + w * (a - e), \text{ for some } w \quad (7)$$

$$(A_x, A_z) = (e_x, e_z) + w * (a_x - e_x, a_z - e_z) \quad (8)$$

$$A_x = e_x + w * (a_x - e_x) \quad (9)$$

$$A_z = e_z + w * (a_z - e_z) \quad (10)$$

Accordingly, the assumptions may be that Q is some point where the camera is facing and also the centre of rotation. The parameter r is roughly the length of the user's arm (if the user is told to either hold their PED at arm's length or stand at arm's length from the camera within an FED. The parameter k is the distance from the camera to a screen projection plane. The angle is the estimated movement of the user's arm for the second view. These being depicted in FIG. 13 with the point $e_L$ 1250Q on the plane S 1250.

Figure 14:
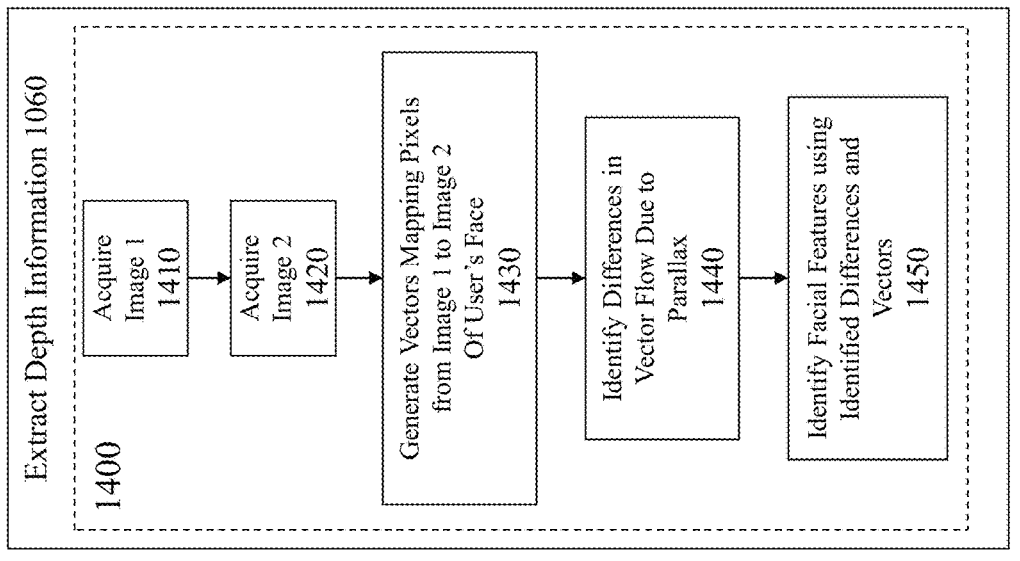
FIG. 14 depicts an exemplary process flow for generating an optical flow map and deriving facial features within the acquired images.

Now referring to FIG. 14 there is depicted an exemplary process flow 1400 for generating an optical flow map and deriving facial features within the acquired images. The process flow 1400 being an example of the processing performed within sixth step 1060 of process flow 1000, "Extract Depth Information." As depicted, process flow 1400 comprises first to fifth steps 1410 to 1450 respectively, these being:

First step 1410 wherein a first image is acquired of the user's face.

Second step 1420 wherein a second image is acquired of the user's face.

Third step 1430 wherein vectors are generated mapping pixels from the first acquired image and second acquired image.

Fourth step 1440 wherein differences in the vectors (vector flow) are identified which arise from parallax.

Fifth step 1450 wherein the vectors are employed to identify facial features based upon the identified differences and vectors. For example, the user's nose projecting forward will present different features to the user's left and right eye sockets and their mouth, for example.

Figure 15:
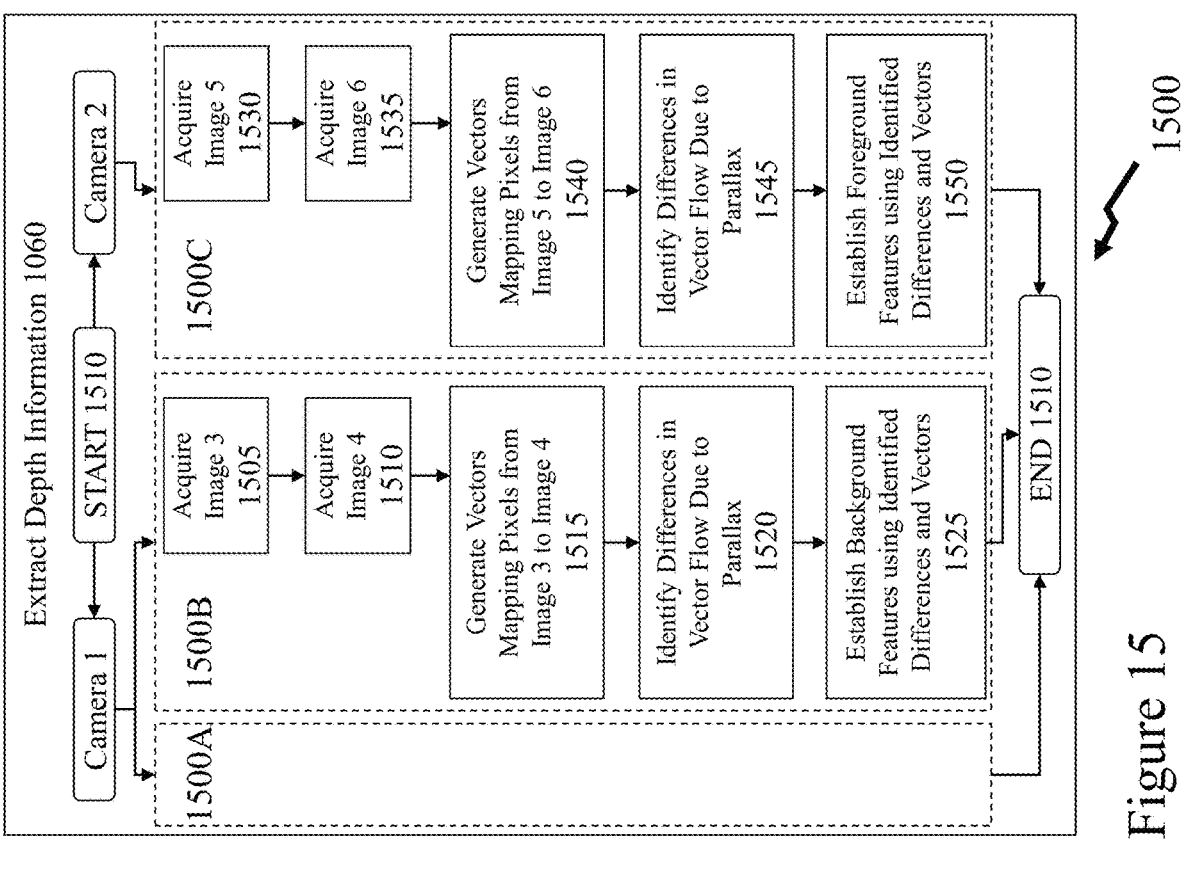
FIG. 15 depicts an exemplary process flow for generating optical flow maps of the user's facial features and background image content from a first camera and foreground image content from a second camera.

Now referring to FIG. 15 there is depicted an exemplary process flow 1500 for generating optical flow maps of the user's facial features and background image content from a first camera and foreground image content from a second camera. The process flow 1500 being an example of the processing performed within sixth step 1060 of process flow 1000, "Extract Depth Information." As depicted, process flow 1500 comprises first to third sub-flows 1500A to 1500C respectively. First sub-flow 1500A being, for example, process flow 1400 in FIG. 14.

Referring to second sub-flow 1500B then this comprises first to fifth steps 1505 to 1525 respectively. These being:

First step 1505 wherein a third image is acquired with the same camera as that used in first sub-flow 1500A.

Second step 1510 wherein a fourth image is acquired with the same camera as that used in first sub-flow 1500A.

Third step 1515 wherein vectors are generated mapping pixels from the third acquired image and fourth acquired image.

Fourth step 1520 wherein differences in the vectors (vector flow) are identified which arise from parallax.

Fifth step 1525 wherein the vectors are employed to identify background features based upon the identified differences and vectors. For example, these may be a building, a vehicle, a post, another individual, an animal etc., for example.

Referring to third sub-flow 1500C then this comprises sixth to tenth steps 1530 to 1550 respectively. These being:

Sixth step 1530 wherein a fifth image is acquired with another camera other than that used in first sub-flow 1500A, for example, a second camera on a PED facing away from the user.

Seventh step 1535 wherein a sixth image is acquired with the same camera as that used in acquiring the sixth image in sixth step 1630.

Eighth step 1540 wherein vectors are generated mapping pixels from the fifth acquired image and sixth acquired image.

Ninth step 1545 wherein differences in the vectors (vector flow) are identified which arise from parallax.

Tenth step 1550 wherein the vectors are employed to identify foreground features, e.g. using the second camera on a PED these are those in front of the user, based upon the identified differences and vectors. For example, these may be a building, a vehicle, a post, another individual, an animal etc., for example.

Figure 16:
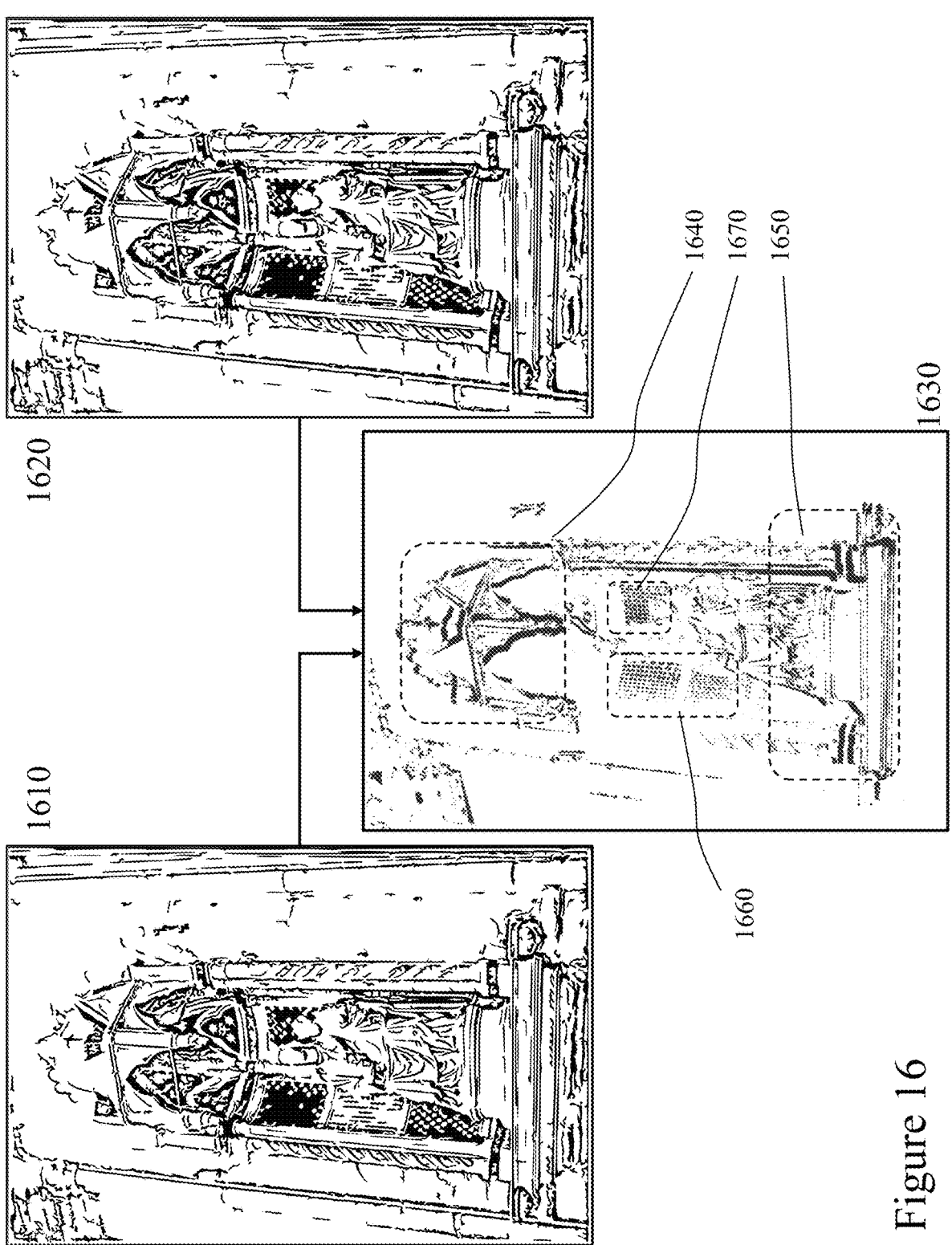
FIG. 16 depicts an exemplary application of the method of FIG. 15 to extracting depth information from a pair of images.

Referring to FIG. 16 there is an example of applying this process using a pair of images taken at slightly different orientations of a statue within an alcove. Accordingly, there are depicted first image 1610 nearly flat to the user and second image 1620 rotated. Third image 1630 depicts the result of subtracting the second image 1620 from the first image 1610 wherein the darker/larger regions are those which show the largest difference. In this instance, the third image represents the magnitude of the shift and hence first and second regions 1640 and 1650 represent areas with increased motion towards the camera whereas third and fourth regions 1660 and 1670 represent areas with increased motion further away from the camera. Alternatively, the difference may have been plotted as vectors defining the distance/direction as described within the process flows but this presents a complex image, so the user has presented the format in third image 1630.

Within embodiments of the invention the images acquired and processed with respect to the background and/or foreground of the user during extraction of their facial features and determination of the depth information relating to these facial features may be employed to verify the presence of features identifiable within database images associated with the geolocation at which the liveness detection is being performed. Accordingly, the depth information associated with these features may be associated with distance information for these features.

It would be further evident that the acquisition of images relating to movement of the user's head may be concurrent to presenting challenges, monitoring blinking, etc. or other anti-spoofing concepts as described above in respect of FIGS. 1-2 and 4-15 respectively.

Whilst the embodiments of the invention have been primarily described in a manner that may suggest to the reader that a PED associated with a user is a smartphone it would be evident that other PEDs may be employed to at least one of present the challenge(s) and/or acquire the response(s). Such PEDs may include, but not be limited to, activity trackers, smart glasses, head mounted displays, wearable devices, smart fabrics, gaming consoles, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:

executing a process to establish whether a user associated with at least one of a verification process, an authorisation process and an authentication process upon an electronic device associated with the user is physically present or their presence is being simulated; wherein the process comprises:

providing a sheet of sense trigger elements to a user, each sense trigger element comprising:
an identity; and
a material for elucidating a gustatory perception response of a user;
providing to the user via an output interface of an electronic device associated with the user an element identity;
receiving from the user via an input interface of the electronic device a response established by the user in response to their tasting the material within the sense trigger element having its identity matching the element identity.

2. A method comprising:

executing a process to establish whether a user associated with at least one of a verification process, an authorisation process and an authentication process upon an electronic device associated with the user is physically present or their presence is being simulated; wherein the process comprises:

providing a sheet of sense trigger elements to a user, each sense trigger element comprising:
an identity; and
a material for elucidating an olfactory response of the user;
providing to the user via an output interface of an electronic device associated with the user an element identity;
receiving from the user via an input interface of the electronic device a response established by the user in response to their smelling the material within the sense trigger element having its identity matching the element identity.

3. A method comprising:

executing a process to establish whether a user associated with at least one of a verification process, an authorisation process and an authentication process upon an electronic device associated with the user is physically present or their presence is being simulated; wherein the process comprises:

providing to the user a subset of a series of memory challenges;
obtaining responses from the user to the subset of the series of memory challenges;
comparing the obtained responses from the user to the subset of the series of memory challenges with stored responses relating to a registered user to whom the series of memory challenges relate;
the registered user completed a registration process for the at least one of the verification process, the authorisation process and the authentication process during which the registered user was presented with a series of memory challenges and provided the stored responses to the series of memory challenges;
the process further comprises comparing data acquired from the electronic device associated with the user whilst the user provides the responses to the subset of the series of memory challenges with other data acquired from another electronic device associated with the registered user whilst the registered user provided the stored responses to the series of memory challenges;

the data comprises:
at least one of:
an identity of the electronic device; and
a geo-location data of the electronic device; and
at least one of:
one or more other identities, each other identity associated with a device associated with the electronic device; and
one or more network identities, each network identity associated with an identity of a network or an element of network infrastructure associated with the electronic device; and the other data comprises:
at least one of:
an identity of the another electronic device; and
a geo-location data of the another electronic device; and
at least one of:
one or more other identities, each other identity associated with another device associated with the another electronic device; and
one or more network identities, each network identity associated with an identity of another network or another element of network infrastructure associated with the another electronic device.

4. A method comprising:

executing a process to establish whether a user associated with at least one of a verification process, an authorisation process and an authentication process upon an electronic device associated with the user is physically present or their presence is being simulated; wherein the process comprises:

establishing data of the user; and
comparing the data of the user with stored data of a registered user acquired whilst the registered user completed a registration process for the at least one of the verification process, the authorisation process and the authentication process during which the stored data of the registered user was established; and
the data is relating to at least one of an odor and a scent of the user acquired with a sensor associated with the electronic device; and
the stored data relates to the at least one of the odor and the scent of the user acquired with another sensor associated with another electronic device employed whilst the user completed the registration process.

5. The method according to claim 4, wherein the process further comprises:

presenting the user with a series of liveness challenges of which acquiring the image of the ear of the user was a liveness challenge of the series of liveness challenges; and
comparing other data of the user acquired from the electronic device in responding to those liveness challenges within the series of liveness challenges other than acquiring the image of the user with stored other data of the registered user acquired whilst the registered user completed a registration process for the at least one of the verification process, the authorisation process and the authentication process during which the stored data of the registered user was established where the stored other data comprises responses to the liveness challenges within the series of liveness challenges other than acquiring the image of the user.

6. The method according to claim 4, wherein the process further comprises:

presenting the user with a series of liveness challenges; and comparing other data of the user acquired from the electronic device in responding to the series of liveness challenges with stored other data of the registered user acquired whilst the registered user completed a registration process for the at least one of the verification process, the authorisation process and the authentication process during which the stored data of the registered user was established where the stored other data comprises responses to the liveness challenges.

7. A method comprising:

executing a process to establish whether a user associated with at least one of a verification process, an authorisation process and an authentication process upon an electronic device associated with the user is physically present or their presence is being simulated; wherein the process comprises:

establishing data of the user; and comparing the data of the user with stored data of a registered user acquired whilst the registered user completed a registration process for the at least one of the verification process, the authorisation process and the authentication process during which the stored data of the registered user was established;

the data is a typing rhythm of the user; and the stored data relates to the typing rhythm established whilst the user completed the registration process.

8. A method comprising:

executing a process to establish whether a user associated with at least one of a verification process, an authorisation process and an authentication process upon an electronic device associated with the user is physically present or their presence is being simulated; wherein the process comprises:

establishing data of the user; and comparing the data of the user with stored data of a registered user acquired whilst the registered user completed a registration process for the at least one of the verification process, the authorisation process and the authentication process during which the stored data of the registered user was established;

the data is a typing rhythm of the user established in dependence upon user actions with respect to a keyboard of the electronic device in responding to a subset of a series of liveness challenges; and the stored data relates to the typing rhythm established whilst the user completed the registration process and established in dependence upon registered user actions with respect to a keyboard of another electronic device upon which the registered user completed the registration process in responding to the series of liveness challenges.

9. A method comprising:

executing a process to establish whether a user associated with at least one of a verification process, an authorisation process and an authentication process upon an electronic device associated with the user is physically present or their presence is being simulated; wherein the process comprises:

establishing data of the user; and comparing the data of the user with stored data of a registered user acquired whilst the registered user completed a registration process for the at least one of the verification process, the authorisation process and the authentication process during which the stored data of the registered user was established;

the data relates to a gait of the user established in dependence upon an accelerometer of the electronic device;

the stored data relates to a gait of the registered user established in dependence upon another accelerometer of another electronic device upon which the user completed the registration process; and the data relating to the gait of the user was established over a period of time the user was walking prior to the user triggering the at least one of the verification process, the authorisation process and the authentication process upon the electronic device.

10. The method according to claim 9, wherein the process further comprises comparing data acquired from the electronic device associated with the user whilst the user provides the responses to the subset of the series of memory challenges with other data acquired from another electronic device associated with the registered user whilst the registered user provided the stored responses to the series of memory challenges.

* * * * *